United States Patent
Duggan et al.

(10) Patent No.: US 10,387,798 B2
(45) Date of Patent: Aug. 20, 2019

(54) MACHINE FOR DEVELOPMENT OF ANALYTICAL MODELS

(71) Applicant: Accenture Global Solutions Limited, Dublin (IE)

(72) Inventors: Desmond Duggan, San Francisco, CA (US); Qian Zhu, Mountain View, CA (US); Teresa Tung, San Jose, CA (US); Jaeyoung Christopher Kang, Berkeley, CA (US); Wenjia Sun, Hornsby (AU)

(73) Assignee: Accenture Global Solutions Limited, Dublin (IE)

( * ) Notice: Subject to any disclaimer, the term of this patent is extended or adjusted under 35 U.S.C. 154(b) by 885 days.

(21) Appl. No.: 14/971,982

(22) Filed: Dec. 16, 2015

(65) Prior Publication Data
US 2017/0178019 A1    Jun. 22, 2017

(51) Int. Cl.
| | | |
|---|---|---|
| *G06F 15/18* | (2006.01) | |
| *G06N 20/00* | (2019.01) | |
| *G06F 8/60* | (2018.01) | |
| *G06F 8/61* | (2018.01) | |
| *G06F 9/50* | (2006.01) | |

(52) U.S. Cl.
CPC ............. *G06N 20/00* (2019.01); *G06F 8/60* (2013.01); *G06F 8/64* (2013.01); *G06F 9/505* (2013.01); *G06F 9/5044* (2013.01); *G06F 9/5055* (2013.01); *G06F 9/5072* (2013.01)

(58) Field of Classification Search
CPC .................................................. G06F 17/5009
USPC ...................................................... 706/15, 45
See application file for complete search history.

(56) References Cited

U.S. PATENT DOCUMENTS

| | | |
|---|---|---|
| 5,991,535 A | 11/1999 | Fowlow et al. |
| 6,208,345 B1 | 3/2001 | Shear |
| 7,636,894 B2 | 12/2009 | Vedula et al. |
| 8,250,009 B1 | 8/2012 | Breckenridge et al. |
| 8,271,541 B2 | 9/2012 | Mohan et al. |
| 8,364,613 B1 | 1/2013 | Lin et al. |
| 8,719,804 B2 | 5/2014 | Jain |
| 8,886,788 B2 | 11/2014 | Tung |
| 9,043,337 B1 | 5/2015 | Chen et al. |
| 2005/0171746 A1 | 8/2005 | Thalhammer-Reyero |
| 2006/0259908 A1 | 11/2006 | Bayer |
| 2007/0016615 A1 | 1/2007 | Mohan |

(Continued)

FOREIGN PATENT DOCUMENTS

EP    2 463 790    6/2012

OTHER PUBLICATIONS

Australian Patent Office, First Examination Report for Australian Patent Application No. 2016259298 dated Apr. 21, 2017, 6 pages.

(Continued)

*Primary Examiner* — David R Vincent
(74) *Attorney, Agent, or Firm* — Brinks Gilson & Lione

(57) ABSTRACT

A machine provides a system and interface to deploy and manage pre-defined analytical models across various compute engines or run time environments, e.g., by exposing analytical model deployment and management parameters to a user while abstracting model deployment activities. The machine also determines proper run time environments for the pre-defined analytical model and verifies the pre-defined analytical model. The machine also provides a dynamically reconfigurable user interface for controlling the machine.

20 Claims, 12 Drawing Sheets

(56) References Cited

U.S. PATENT DOCUMENTS

| | | |
|---|---|---|
| 2007/0157179 A1 | 7/2007 | Seeger |
| 2007/0240080 A1 | 10/2007 | Eldridge |
| 2012/0191630 A1 | 7/2012 | Breckenridge et al. |
| 2012/0284600 A1 | 11/2012 | Lin et al. |
| 2013/0144819 A1 | 6/2013 | Lin |
| 2013/0152047 A1 | 6/2013 | Moorthi et al. |
| 2014/0046879 A1 | 2/2014 | Maclennan et al. |
| 2014/0278312 A1 | 9/2014 | Nixon et al. |
| 2014/0279725 A1 | 9/2014 | Kuusela |
| 2015/0161385 A1 | 6/2015 | Gounares |
| 2015/0170048 A1 | 6/2015 | Lin et al. |
| 2015/0235143 A1 | 8/2015 | Eder |
| 2015/0321427 A1 | 11/2015 | Gunnarsson |
| 2015/0339572 A1 | 11/2015 | Achin et al. |
| 2015/0341212 A1 | 11/2015 | Hsiao |
| 2015/0378716 A1 | 12/2015 | Singh |
| 2016/0300156 A1 | 10/2016 | Bowers |
| 2016/0307115 A1 | 10/2016 | Wu |
| 2017/0115964 A1 | 4/2017 | Vadapandeshwara et al. |
| 2017/0178019 A1 | 6/2017 | Duggan |
| 2017/0178020 A1 | 6/2017 | Duggan |
| 2017/0178027 A1 | 6/2017 | Duggan |
| 2017/0316114 A1 | 11/2017 | Bourhani |
| 2018/0032038 A1 | 2/2018 | Kang |

OTHER PUBLICATIONS

Australian Patent Office, Second Examination Report for Australian Patent Application No. 2016259298 dated Jul. 31, 2017, 3 pages.
Australian Patent Office, First Examination Report from Australian Patent Application No. 2016259300 dated Apr. 12, 2017, 5 pages.
Australian Patent Office, Notice of Acceptance from Australian Patent Application No. 2016259300 dated May 24, 2017, 3 pages.
European Patent Office, Extended European Search Report for European Patent Application No. 16199043.7 dated May 18, 2017, 10 pages.
European Patent Office, Extended European Search Report from European Patent Application No. 16199057.7 dated May 22, 2017, 7 pages.
Guazzelli et al., "Efficient deployment of predictive analytics through open standards and cloud computing." ACM SIGKDD Explorations Newsletter 11(1), pp. 32-38, 2009, [retrieved from Internet on Apr. 11, 2017] <URL: http://zementis.com/docs/SIGKDD_ADAPA.pd>.
Guazzelli et al. "PMML: An open standard for sharing models." The R Journal 1(1), pp. 60-65, 2009, [retrieved from Internet on Sep. 11, 2017] <URL: https://journal.r-project.org/archive/2009-1/RJournal 2009-1 Guazzelli+et+al.pdf>, 6 pages.
Kosaku et al., "Runtime Composition for Extensible Big Data Processing Platforms", 2015 IEEE $8^{th}$ International Conference on Cloud Computing, Jun. 1, 2015, pp. 1053-1057, XP055272472, DOI: 10.1109/CLOUD.2015.151, ISBN 978-1-4673-7287-9.
Sun et al., "Towards Delivering Analytical Solutions in Cloud: Business Models and Technical Challenges", 2011 Eight IEEE International Conference on e-Business Engineering, pp. 347-351, IEEE, 20111.
Australia Patent Office, Examination Report No. 1 for Australia Application No. 2017202599 dated Oct. 20, 2017, 8 pages.
European Patent Office, European Search Report from European Patent Application No. 17167892.3 dated Nov. 1, 2017, 2 pages.
Australian Patent Office, Examination Report No. 2 for Australian Patent Application No. 2017202599 dated Apr. 6, 2018, pp. 1-3.
Non-final Office Action issued for related U.S. Appl. No. 14/971,987 dated Feb. 28, 2019, 10 pages.
Final Office Action issued for related U.S. Appl. No. 15/198,711 dated Dec. 26, 2018, 24 pages.
Non-final Office Action issued for related U.S. Appl. No. 15/420,947 dated Mar. 7, 2019, 27 pages.

Analytics Dashboard

User 1

Event Stream:
App "Survival Analysis v1" has finished.

Navigation:
Experiments
Data Sources
Account Settings

Add New Model

Name: Classification Model C — 804

Description: This model will use iteration count instead — 806

Label Variables: Required Machines Count — 808

Input Variables: [CPU Usage ×] [# CPU Cores ×] — 810
[%RAM Usage ×] [Avg. Picture Size ×]

Approach Template: Logistic Regression ▶ — 812

Attributes

| Name | Description | Range | Input Value |
|---|---|---|---|
| ElasticNetParam | Penalty for model fitting. Only RegParam or ElasticNetParam | Parameter ~ [0.0, 1.0], default 0 | |
| RegParam | Regularization. Only RegParam or ElasticNetParam | Parameter ~ [0.0, 1.0], default 0 | |
| MaxIter | Max number of iterations. Only MaxIter or Tol. | Parameter ~ [0.0, +Infinity], default 100 | |
| Tol | Convergence | Parameter ~ [0.0, 1.0], default 0 | |
| FitIntercept | Fit of Intercept | Parameter ~ [true, false], default true | |

Actions ▶
Create New Model
Upload New Model

MACHINE FOR DEVELOPMENT OF ANALYTICAL MODELS

CROSS-REFERENCE TO RELATED APPLICATIONS

This application is related to U.S. Application titled "MACHINE FOR DEVELOPMENT AND DEPLOYMENT OF ANALYTICAL MODELS", which is filed concurrently with this application and is hereby incorporated by reference in its entirety.

TECHNICAL FIELD

This disclosure relates to machines and complex system architectures for building and/or deploying analytical models.

BACKGROUND

The field of data science, and more particularly, the development and implementation of analytical models, has typically required strong computer and processing system skills and familiarity with data science. These specialized skills were needed to develop, setup, and program model algorithms and to access and prepare data so that the data was effective for training the model, and so that running the model on the data would give meaningful results. These complex technical challenges have traditionally left scientists and engineers with the daunting task of building and implementing analytical models that are useful in their engineering and scientific fields. That is, analytical modeling is typically a field in which scientists and engineers have less familiarity, and which in any event is tangential to their primary goal of extracting insights from data.

Additionally, creating accurate analytical models is often an experimental process requiring multiple iterative cycles of hypothesis testing. The iterative cycles can each take significant time to setup and/or complete (e.g., days or months). The extended creation, setup, and/or training process hinders development of additional analytical models and analytical models of higher accuracy.

BRIEF DESCRIPTION OF THE DRAWINGS

FIG. 8 shows a variation of the example graphical user interface of FIG. 7.

DETAILED DESCRIPTION

Figure 1:
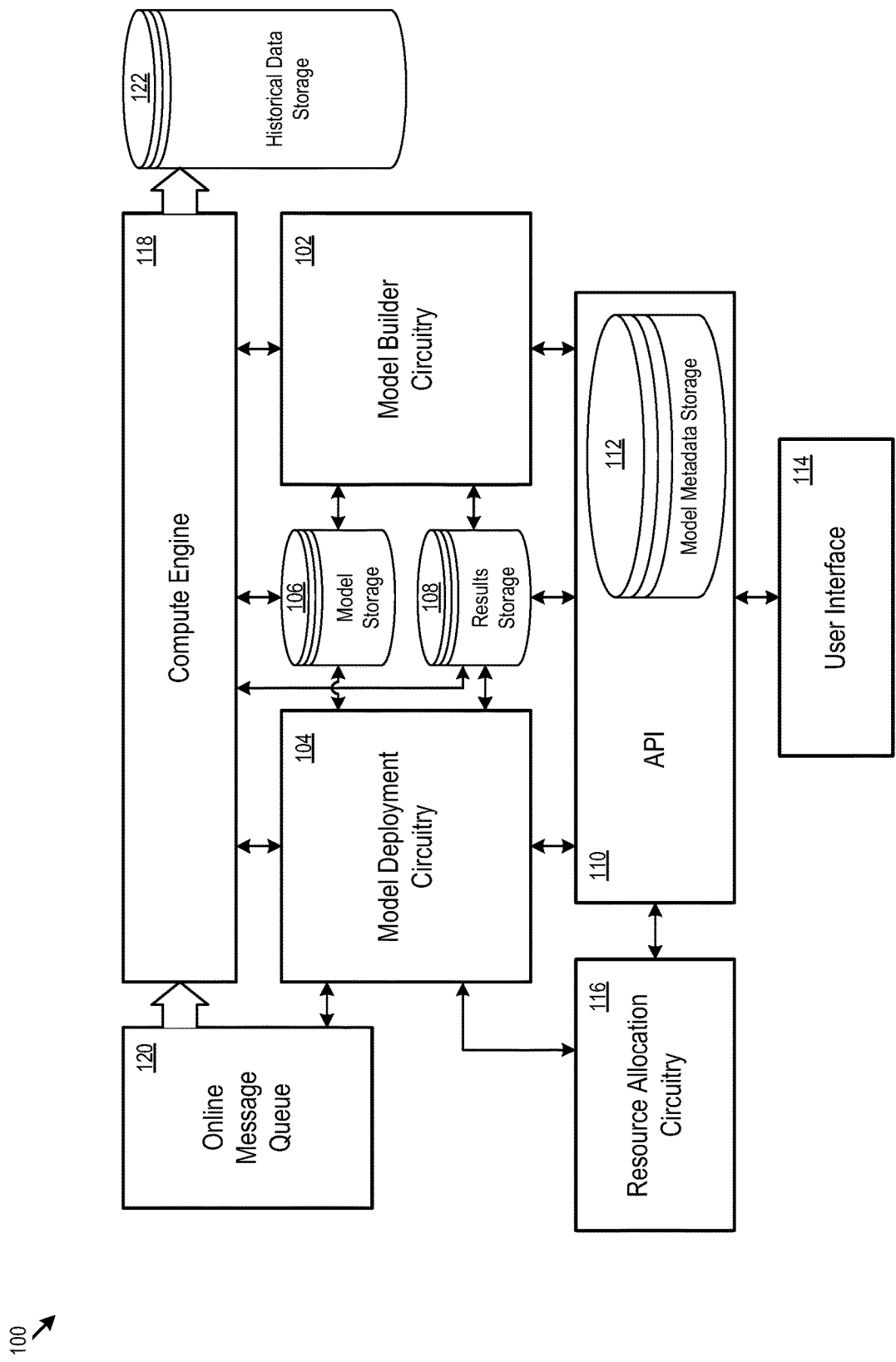
FIG. 1 shows an example machine for implementing machine learning.

Analytical models, also called predictive models, are a form of mathematical model that defines and describes relationships among variables in a data set. An analytical model may include an equation and a set of coefficients which, together, map an arbitrary number of input variables to an output, typically a single output. This output can be used to provide predictive results for a given set of inputs. For example, an analytical model may receive inputs of a future date and the current temperature, and may provide an output predicting the chance of rain on that future date. Analytical models can also provide information on events, occurrences, or transactions that have already occurred. For example, analytical models can be used to determine whether a recorded transaction was fraudulent.

Analytical models may take many different forms, including machine learning models or equations. Machine learning models are abstractions of machine learning approaches. Example machine learning approaches include linear regression, decision trees, logistic regression, Probit regression, time series, multivariate adaptive regression splines, neural networks, Multilayer Perceptron (MLP), radial basis functions, support vector machines, Naïve Bayes, and Geospatial predictive modeling, to name a few. The machine learning model can be trained on a set of training data. The training results in an equation and a set of coefficients which map a number of input variables to an output, typically a single output. In the model, coefficients of the equations can often be parameterized as:

$$y = \sum_{j=1}^{N} (a_j x_j)$$

where $a_j$ is a coefficient and $x_j$ is an input and y is the predicted output. In essence, both the machine learning model and the equation are subclasses of a higher order class referred to as a model.

The possible number and diversity of applications for analytical modeling is essentially limitless. However, a technical challenge exists in that the development and implementation of analytical models requires extensive experience in data science and/or data engineering. For example, development and implementation of an analytical model may require extensive computer programming abilities to properly configure and run the analytical model, which is a skill typically associated with a data engineer. Further, given the overhead cost and time to develop and implement an analytical model, in order to reduce the number of iterations, a data scientist is often required to select the best analytical model type and provide the best configurations of that model based on their extensive understandings of mathematical modeling and the model types involved.

A third player, the domain expert, may provide the most insight into creating accurate analytical models. A domain expert has extensive experience or knowledge about the subject matter that is the focus of a particular analytical model. The domain expert may be best suited to analyze a particular set of data or a particular subject given their experience, wisdom, or intuition in that subject to help create and optimize a particular analytical model. However, as discussed above, domain experts may not have the requisite data science and/or data engineering understanding required to successfully and efficiently implement an analytical model. For example, a meteorologist may be best suited to analyze a data set relating to weather changes to create an accurate analytical model. However, that meteorologist may not be versed in data science so as to be able to initially select the best model type and coefficients that result in the lowest number of model testing iterations during development of that model. Thus, the meteorologist may require more model alteration and testing iterations to fine tune an analytical model. Moreover, the meteorologist may not have any computer programming experience or programming knowhow required to create, implement or run the analytical model, which would otherwise require the services of an experienced data engineer.

Thus a technical challenge exists in exposing the development and implementation of analytical models to domain experts in a way that allows domain experts to quickly, easily, and iteratively develop, test, and implement analytical models. These technical challenges faced by the domain expert may be prove prohibitive to the development and implementation of analytical models in many instances. Additionally, data scientist and data engineers face similar technical challenges of quickly and efficiently developing, testing, and implementing analytical models.

The system architecture for machine learning described below implements technical solutions to these and other technical challenges. FIG. 1 shows an example machine 100 for implementing machine learning. The machine 100 includes model builder circuitry 102 and model deployment circuitry 104. The machine 100 also includes a model storage database 106, a results storage database 108, and an application programming interface (API) 110, which may define functional access (e.g., through function calls) to a model metadata storage database 112 as well the model builder circuitry 102, the model deployment circuitry 104, the results storage database 108, the resource allocation circuitry 116, and/or other elements of the machine 100. The machine 100 further includes user interface circuitry 114 and resource allocation circuitry 116. The machine 100 may further include or be coupled to a compute engine 118, an online message queue 120, and/or an historical data storage database 122.

Figure 2:
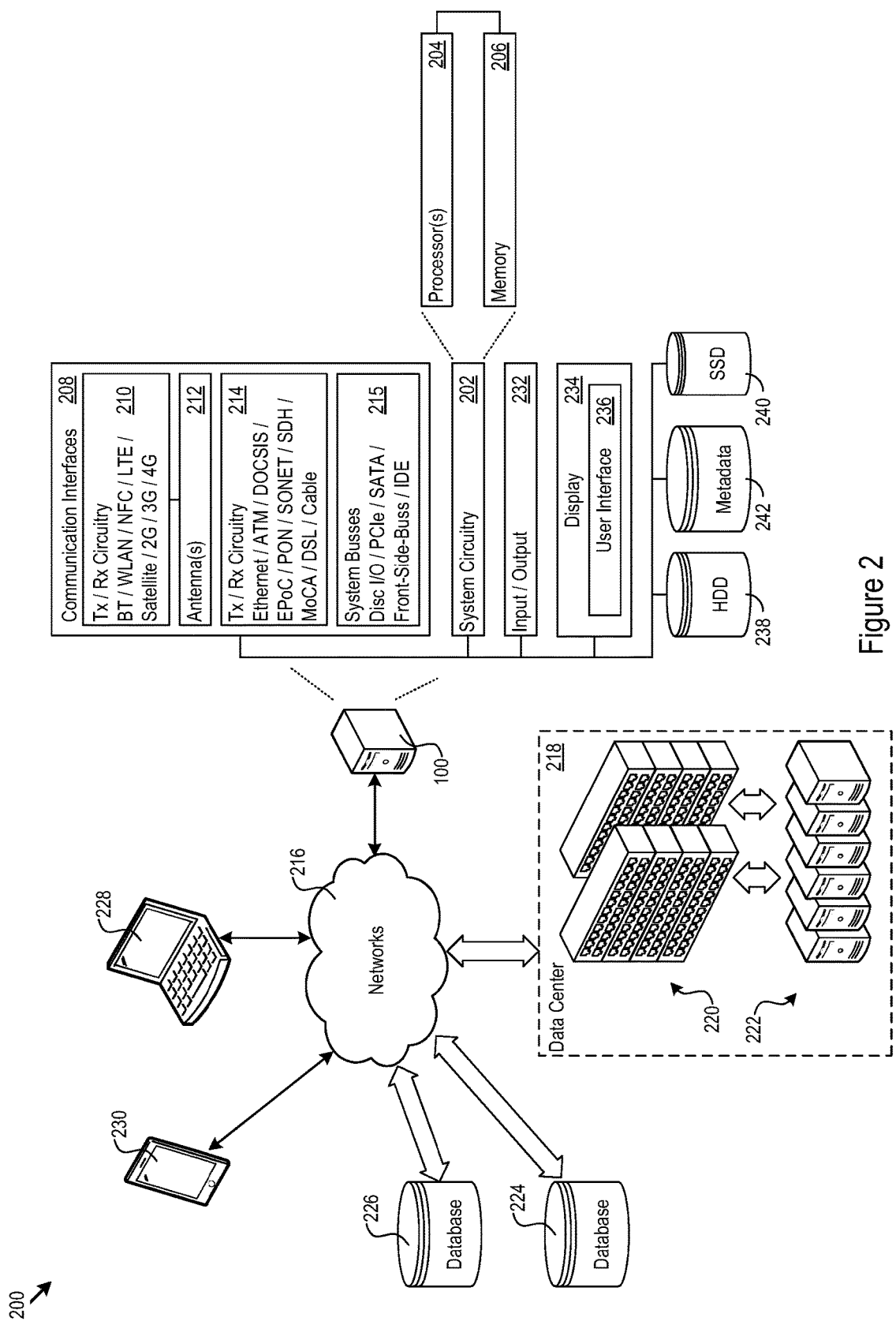
FIG. 2 shows an example specific system implementation for the machine.

The various components and circuitry of the machine 100 are interconnected, for example, by one or more system busses 215 of communication interfaces 208 (see FIG. 2). The system busses 215 may be configured to enable intercommunication between the model builder circuitry 102, the model deployment circuitry, 104, the user interface circuitry 114, the resource allocation circuitry 116, the compute engine 118, the model storage database 106, and/or the results storage database 108 when such elements are collocated within a single machine 100 or a cluster of closely networked machines. If such elements are distributed across one or more separate computers or server forming parts of the machine 100, intercommunication between the elements may be effected through wired communication circuitry 214 and/or wireless communication circuitry 210 (see FIG. 2). The communication interfaces 208, and particularly the wireless communication circuitry 210 or wired communication circuitry 214, may also be connected to a network 216 (see FIG. 2) such as the Internet or another intranet. By and through the communication interfaces 208 or other communication connections, the model builder circuitry 102 can communicate with the user interface circuitry 114, the model storage database 106, the results storage database 108, and/or the compute engine 118. By and through the communication interfaces 208 (e.g., the system busses 215, the wireless communication circuitry 210, or the wired communication circuitry 214), the model deployment circuitry 104 can communicate with the user interface circuitry 114, the model storage database 106, the results storage database 108, the resource allocation circuitry 116, the online message queue 120, and/or the compute engine 118. Similarly, by and through the communication interfaces 208 or other communication connections, the resource allocation circuitry 116 can communicate with the user interface circuitry 114, while the results storage database 108 can be accessed by the user interface circuitry 114 and/or the compute engine 118 (e.g., for storage of computed or predictive results). Similarly still, by and through the communication interfaces 208 or other communication connections, the model storage database 106 can be accessed by the compute engine 118 (e.g., for storage or recalling or storing analytical models). Other interconnections may be possible. For example, the model builder circuitry 102 may be connected to the historical data storage database 122 to retrieve stored historical data, for example, during training of an analytical model. In some embodiments, much of the communication between the user interface circuitry 114 and other circuitry components or databases of the machine 100 may be conducted according to interface instructions or commands specified by the API 110.

The model builder circuitry 102 creates and develops new analytical models or edits existing analytical models. The model builder circuitry 102 also trains and validates new and existing analytical models with training data. The model builder circuitry 102 also manages the storage of trained and untrained analytical models and updates metadata related to those analytical models. The model builder circuitry 102 may interact with a user via the user interface circuitry 114, for example, according to rules and functions defined and exposed to other entities by the API 110. The model builder circuitry 102 may also interact with the compute engine 118 to train an analytical model. Further technical details of the model builder circuitry 102 are provided below.

The model deployment circuitry 104 deploys analytical models on the compute engine 118, for example, to perform predictions on live incoming data, historical data, batch data, and/or stored data. The model deployment circuitry 104 retrieves analytical models stored in the model storage database 106. The stored analytical models may have been created by the model builder circuitry 102 in certain embodiments. The model deployment circuitry 104 prepares analytical model processing pipelines to process (e.g., with the compute engine 118) incoming data (e.g., provided via the online message queue 120) and to store results of the processing (e.g., in results storage database 108). Further technical details of the model deployment circuitry 104 are provided below.

The resource allocation circuitry 116 determines resource loads for analytical models and determines resource load capabilities of a compute engine 118 or other resources. In so doing, the resource allocation circuitry 116 can determine a maximum execution frequency for an analytical model on the compute engine 118. The resource allocation circuitry 116 can also schedule execution of an analytical model by the compute engine 118 according to the maximum execution frequency and/or other factors, rules, and considerations. Further technical details of the resource allocation circuitry 116 are provided below.

The user interface circuitry 114 provides an analytical model control user interface to a user. The user interface circuitry 114 interacts with a user, the model builder circuitry 102, and the model deployment circuitry 104, for example, through the API 110, to facilitate user control of each of the circuitry elements. For example, the user interface circuitry 114 allows a user to create, edit, or train an analytical model using the model builder circuitry 102. The user interface circuitry 114 may also allow a user to deploy or withdraw deployment of an analytical model using the model deployment circuitry 104, or to setup or edit a processing pipeline for the analytical model using the model deployment circuitry 104. The user interface may implement a dynamically reconfigurable graphical user interface (GUI). Further technical details of the user interface circuitry 114 are provided below.

FIG. 2 shows an example specific system implementation 200 for the machine 100 described above. According to the system implementation 200, the machine 100 includes system circuitry 202 to support implementation of the various circuitry elements and functionality discussed above with respect to FIG. 1 and elsewhere. In one embodiment, the system circuitry 202 includes processors 204, memory 206, and/or other circuitry. The processors 204 may be connected to the memory 206 and may comprise a memory system including a plurality of memory devices collocated or distributed across multiple systems. The memory 206 may store control instructions, operational parameters for the control instructions, datasets, and other information. The control instructions may be executed by the processor 204 to implement any of the processing described below, according to a configuration set by the operational parameters. Further, in some embodiments, various circuitry elements of the machine 100 may be implemented by the system circuitry 202. For example, the model builder circuitry 102, model deployment circuitry 104, the model storage database 106, the results storage database 108, the API 110, the model metadata storage database 112, the user interface circuitry 114, and/or the resource allocation circuitry 116 may be implemented in whole or in part by one or more instances of the system circuitry 202.

Figure 3:
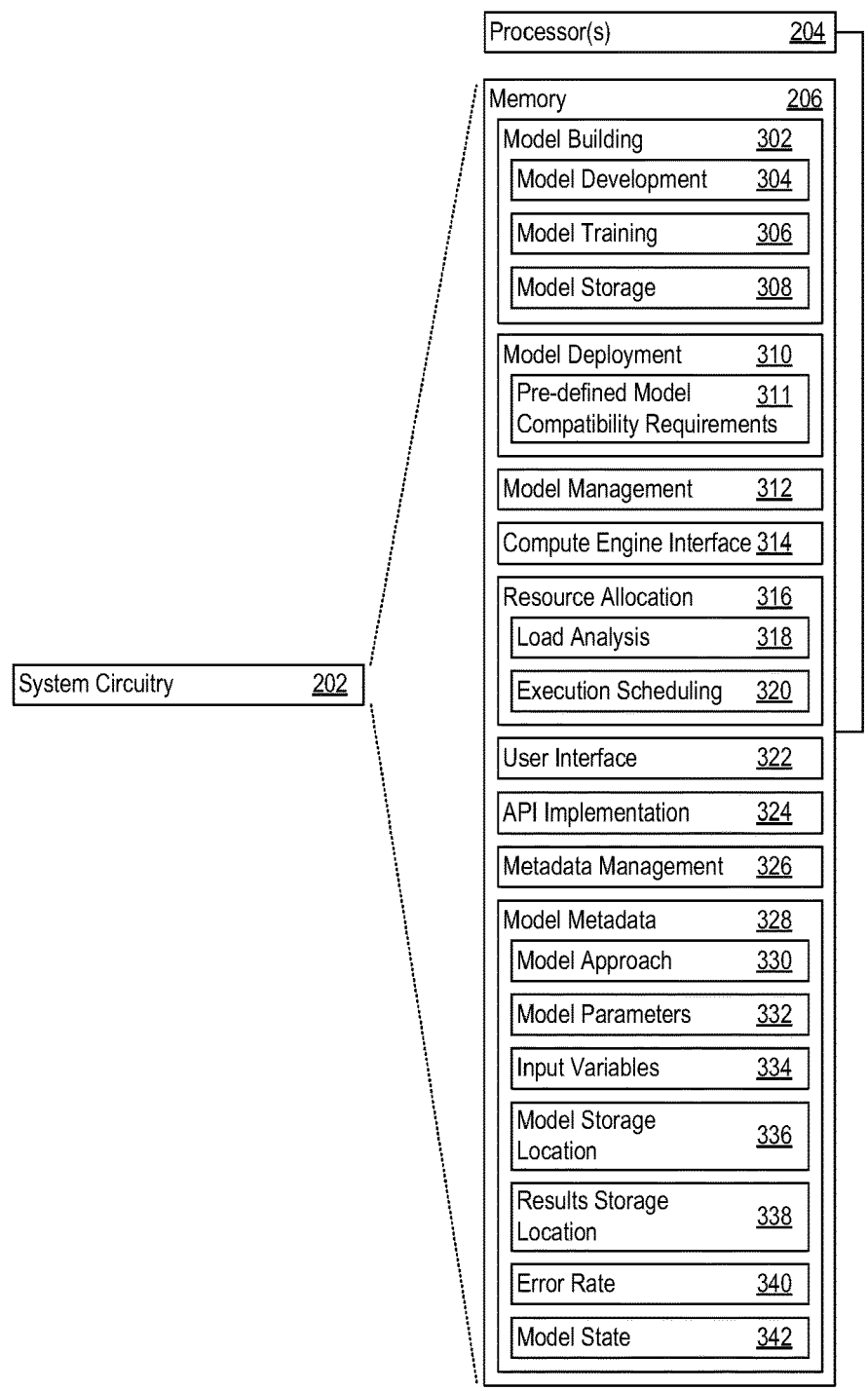
FIG. 3 shows further detail of the example specific system implementation shown in FIG. 2.

As is shown in FIG. 3, the memory 206 may store data and instructions for use by the circuitry elements and/or to implement portions of the circuitry elements. In one embodiment, the memory 206 includes model building instructions 302, which may further include model development instructions 304, model training instructions 306, and model storage instructions 308. The processor 204, memory 206, and model building instructions 302 may implement portions of the model builder circuitry 102 shown in FIG. 1.

The memory 206 may also include model deployment instructions 310. The processor 204, memory 206, and model deployment instructions 310 may implement portions of the model deployment circuitry 104 shown in FIG. 1. As part of the model deployment instructions 310, the memory 206 may include pre-defined analytical model compatibility requirements 311 (discussed below). The memory 206 may also include model management instructions 312. The processor 204, memory 206, and model management instructions 312 may implement various portions of the model builder circuitry 102, the model deployment circuitry 104, or other circuitry elements to provide functions relating to the management of analytical models. Some of these model management functions include storing, updating, cataloging, maintaining, tracking, and versioning of analytical models, storing and tracking update histories for analytical models or training data, scheduling deployment, un-deployment, updates, maintenance, evaluation, and re-training of analytical models, storing connections between analytical models and training data, and storing and maintaining status and logs for analytical models (e.g., to find existing analytical models for future projects). The model management instructions 312 may implement version management features. For example, during its lifetime, an analytical model may become less accurate, at which point it may be retrained (e.g., to reestablish the relevant data inputs and values of the coefficients) or be decommissioned. To support such model management functions, the model management instructions 312 may provide instructions and logic for grouping versions of analytical models and allowing comparison between the performances of the various analytical models. For example, versions of analytical models may be grouped according to version number, creation date, revision dates, model type, run time environment, error rate, or other sortable characteristics.

The memory 206 may also include compute engine interface instructions 314 for interfacing with the compute engine 118. The processor 204, memory 206, and compute engine interface instructions 314 may implement or work with portions of the model builder circuitry 102 and/or the model deployment circuitry 104 that interface with the compute engine 118. For example, the compute engine 118 may be a third-party cloud computing service or analytics service which may utilize a particular API, instruction set, or other interface, with which the compute engine interface instructions 314 may provide instructions for interaction. In one example, the compute engine 118 includes a job server to start and stop data processing jobs via Hypertext Transfer Protocol (HTTP) instructions and the compute engine interface instructions 314 may enable interaction therewith.

The memory 206 may include resource allocation instructions 316 which may further include nested therein load analysis instructions 318 and execution scheduling instructions 320. The processor 204, memory 206, and resource allocation instructions 316 may implement portions of the resource allocation circuitry 116 shown in FIG. 1. The memory 206 may also include user interface instructions 322. The processor 204, memory 206, and user interface instructions 322 may implement portions of the user interface circuitry 114. The user interface instructions 322 may include instructions and logic to provide or implement a dynamically reconfigurable GUI to a user. The memory 206 may also include API implementation instructions 324 which may implement the API 110.

The memory 206 may include metadata management instructions 326. The processor 204, memory 206, and metadata management instructions 326 may control the creation, storage, updating, and removal of metadata associated with analytical models. The metadata management instructions 326 may work in tandem with the model management instructions 312 to perform functions relating to the management of analytical models. Further, the processor 204, memory 206, and the metadata management instructions 326 may operate with the API implementation instructions 324 or the API 110 to interface with a model metadata storage database 112 and/or to enable the user interface circuitry 114 to interact with model metadata stored within the model metadata storage database 112 or elsewhere.

The memory 206 may also store model metadata 328. In one embodiment, the model metadata 328 stored on the memory 206 operates as the model metadata storage database 112 or as another metadata store 242 shown in FIG. 2. In another example, the model metadata 328 shown in FIG.

3 may be stored in another location, such as metadata store 242. The model metadata 328 may include, for example, model approach metadata 330, model parameters metadata 332, input variables metadata 334, model storage location metadata 336, results storage location metadata 338, error rate metadata 340, and model state metadata 342. Other types of model metadata may also be stored as part of the model metadata 328 such as, for example, analytical model subclass metadata, analytical model type metadata, output variables metadata, date metadata, update history metadata, and version metadata. The model metadata 328 may be stored in a persistent cache for fast access.

Returning to FIG. 2, the system implementation 200 may also include communication interfaces 208, which may support wireless communication via wireless communication circuitry 210 and antennas 212. Example wireless communication protocols may include Bluetooth, Wi-Fi, WLAN, near field communication protocols, cellular protocols (2G, 3G, 4G, LTE/A), and/or other wireless protocols. Also, communication interface 208 may include wired communication circuitry 214. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols; synchronous digital hierarchy (SDH) protocols, Multimedia over coax alliance (MoCA) protocols, digital subscriber line (DSL) protocols, cable communication protocols, and/or other networks and network protocols. The communication interfaces 208 may be connected or configured to connect to one or more networks 216, including the Internet or an intranet, to enable the machine 100 and the system circuitry 202 therein to communicate with other systems and devices. Additionally, the communication interface 208 includes system buses 215 to effect intercommunication between various elements, components, and circuitry portions of the machine 100. Example system bus implementations include PCIe, SATA, and IDE based buses.

The communication interfaces 208 may enable interconnection of various circuitry components illustrated in FIG. 1 within the machine 100 (e.g., via one or more buses, computer component interfaces, or peripheral component interfaces). For example, the communication interfaces 208 may couple to the model builder circuitry 102, the model deployment circuitry 104, the resource allocation circuitry 116, and the user interface circuitry 114. Further, the communication interfaces 208 may couple to the model metadata storage database 112, the results storage database 108, and/or the model storage database 106 internally via system busses 215 if internally maintained, or externally via the wireless communication circuitry 210 or the wired communication circuitry 214 if externally maintained.

The communication interfaces 208 may support communication with data centers 218. The data centers 218 may include data stores 220 and/or processing servers 222. The data centers 218 may be external or third-party data centers 218 that are operated by a separate service provider than an operator of the machine 100. Alternatively, the data centers 218 may be directly or indirectly associated with the machine 100, for example, as part of a combined or shared service operated by a common service provider. In one embodiment, the data center 218 provides the compute engine 118 used by the machine 100 as an analytics service, cloud computing service, or cluster computing service to provide online analytical processing (OLAP) of analytical models. Examples of such computing service frameworks include Spark™, Hadoop®, Apache™, Yarn, R, and OpenCV. Commercial versions of the data centers 218 may include services such as Amazon® Web Services, Google Cloud Compute Engine, Oracle®, and Microsoft® Azure™. In some embodiments, the data center 218 is a cluster of machines that may be physical, virtual, or containerized that run some other framework (e.g., R or OpenCV), which may include a load balancer as a front end. By certain approaches, if the machines are containerized or virtualized, the containerized or virtualized machines can be autoscaled up and down.

The data center 218 may provide data storage services. In other embodiments, the machine 100 may be in communication via the network 216 with multiple other databases, such as database 224 and database 226, which may also provide data storage services. Example data storage services include Amazon® S3™, Google® Cloud Storage, and Windows® Azure™ Storage. These external data storage services (e.g., data center 218, database 224, and/or database 226) may be utilized for the model storage database 106, the results storage database 108, the model metadata storage database 112, and/or the historical data storage database 122 shown in FIG. 1.

The communication interfaces 208 may support communication with external client devices, such as a client computer 228 or a client mobile device 230. Communication with the external client devices may be effected through user interface circuitry 114 and/or with user interface instructions 322. A dynamically reconfigurable GUI may be provided to the external client devices via the networks 216 to enable interaction between the client devices and the machine 100.

In some embodiments, the machine 100 may itself include various I/O interfaces 232, for example, to enable local maintenance engineers to interact with the machine 100. The machine 100 may also include a display 234 and local user interface 236 that may include human interface devices and/or a local graphical user interface GUI. The local GUI may be used to present a control dashboard, actionable insights and/or other information to a maintenance engineer. The local GUI may support portable access, such as, via a web-based GUI, to enable maintenance on the machine 100 or other interaction with the machine 100. This local GUI may be the same as or different from the GUI described elsewhere for development and deployment of analytical models.

The machine 100 may also include a hard drive 238 and/or a solid-state drive 240 to enable local storage of system software, user interfaces, or system instructions. The machine 100 also include a metadata store 242, which may be included on or separate from the hard drive 238 and/or a solid-state drive 240. The metadata store 242 may operate as the model metadata storage database 112 shown in FIG. 1 and/or the storage location for the model metadata 328 shown in FIG. 3.

Figure 4:
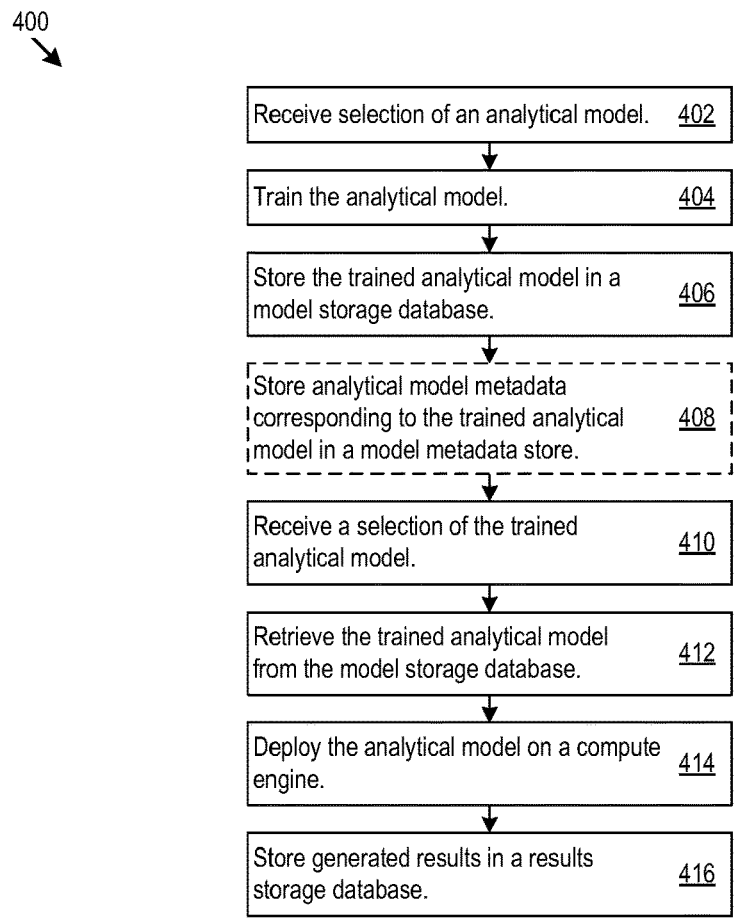
FIG. 4 shows a flow diagram of logic that the machine may implement.

FIG. 4 shows a flow diagram of logic 400 that the machine 100 may implement to build and/or deploy an analytical model. For instance, the model builder circuitry 102 and/or the model deployment circuitry 104 may be configured to implement some or all of the logic 400 shown in FIG. 4. The model builder circuitry 102 may be configured to receive a selection of an analytical model via the communication interface 208 (402). For example, a user operating a client device (e.g., client computer 228 or client mobile device 230) may make a selection of a new or existing analytical model to develop. This may entail a selection of a particular base analytical model algorithm type upon which to base a new analytical model on, or may entail selection of an existing analytical model previously started or developed.

The model builder circuitry 102 may be configured to receive a selection or alteration of inputs, output, and/or parameters for the analytical model. Model building instructions 302, and particularly model development instructions 304, stored in memory 206 may provide instructions and logic to effect selection of the analytical model and the selection or alteration of the inputs, outputs, and/or parameters for the analytical model.

In an alternative embodiment, the machine 100, and in particular, the model builder circuitry 102 or the model deployment circuitry 104, may receive a pre-defined analytical model from any source, such as a client device communicating over the communication interface 208. The pre-defined analytical model may take, for instance, the form of an analytical model code bundle, including code and data, that represent or encode a model of any kind. In some embodiments, the pre-defined analytical model may also be paired with pre-computed coefficients to start or configure the pre-defined analytical model. Theses pre-computed coefficients are either passed to the system at the time of submission of the pre-defined analytical or are results passed to the system from the running of another analytical model. These pre-computed coefficients for the pre-defined analytical model may have been developed or calculated (e.g., trained), for example, using a different machine or system or using the same machine 100 at a different previous time. In other embodiments, the pre-defined analytical model does not have or include corresponding coefficients, and the pre-defined analytical model may be trained to develop coefficients, as is discussed below. The pre-defined analytical model and/or the associated coefficients may be stored in model storage database 106 as would an analytical model created by the model builder circuitry 102. Other processes discussed herein with respect to an analytical model created with the model builder circuitry 102 may, in many instances, be performed on the pre-defined analytical model uploaded to the machine 100. For example, deployment of the analytical model by the model deployment circuitry may, in many instances, be the same as with a pre-defined analytical model.

The model builder circuitry 102 may be configured to train the analytical model to create a trained analytical model (404). In certain embodiments, training the analytical model (404) may be performed on the compute engine 118 using user-designated training data. The user-designated training data may be provided directly by the user, may be stored on a data store internal to the machine 100 (e.g., within memory 206, hard drive 238, or solid-state drive 240), or may be stored on a data store external to the machine 100 and accessible via the network 216 (e.g., within data center 218, or database 224 or 226). The user-designated training data may be artificially generated or may be portions of actual historical data, for example, stored in historical data storage database 122, which portions are specified by a user.

In other embodiments, training the analytical model (404) may further include validating the trained analytical model using the user-designated training data and determining an error rate of the trained analytical model. Such validation may include cross-validation techniques, including n-fold or k-fold cross-validation, or other rotation estimation techniques or model validation techniques understood in the art. The error rate produced may be a measure of fit. The error rate may comprise root mean squared error, mean squared error, median absolute deviation error, positive predictive value error, misclassification error (e.g., for binary classifications), or other known measures of fit. Model building instructions 302, and particularly model training instructions 306, stored in memory 206 may provide instructions and logic to effect training the analytical model and/or validation of the trained analytical model.

The model builder circuitry 102 may be configured to store the trained analytical model in the model storage database 106 (406). The instance of the trained analytical model, including all its state information, may be stored in the model storage database 106. The model storage database 106 may be implemented on a data store internal to the machine 100 (e.g., within memory 206, hard drive 238, or solid-state drive 240), or may be stored on a data store external to the machine 100 and accessible via the network 216 (e.g., within data center 218, or database 224 or 226). Model building instructions 302, and particularly model storage instructions 308, stored in memory 206 may provide instructions and logic to effect storage of the trained analytical model.

The model builder circuitry 102 may be configured to store model metadata characterizing the trained analytical model in the model storage database 112 as model metadata 328 (408). For example, the model metadata may include an analytical model parameter for the trained analytical model, a storage location specifier for the trained analytical model, and/or a storage location specifier for the results of the generated results of the trained analytical model. A selected base analytical model algorithm type may be stored as model approach metadata 330, while analytical model parameters and input variables may be stored as model parameters metadata 332 and input variables metadata 334, respectively. A calculated error rate can be stored as error rate metadata 340. Metadata management instructions 326 stored on memory 206 may provide instructions to effect management of the model metadata 328. From here on, the machine 100 has a reference to where the trained analytical model is persisted and how it can be used to make predictions on incoming data and batch data.

Once an analytical model has been trained and stored, deployment of the trained analytical model can be achieved according to the following. The model deployment circuitry 104 may be configured to receive a selection of trained analytical model (410). For example, a user may select a trained analytical model from a list or may enter an indication of a particular trained analytical model. The model deployment circuitry 104 may then be configured to retrieve the trained analytical model from the model storage database 106 (412). In one embodiment, the model deployment circuitry 104 accesses the model metadata storage database 112 to retrieve model metadata 328 about the selected trained analytical model. The model deployment circuitry 104 may then review the model storage location metadata 336 to determine where the selected trained analytical model is stored within the model storage database 106. Other model metadata 328 may be useful as well such as, for example, model parameters metadata 332 and/or input variables metadata 334.

The model deployment circuitry 104 may be configured to deploy the trained analytical model on compute engine 118 to process incoming data and to generate results (414). The model deployment circuitry 104 may be configured to store the generated results in a results storage database 108 (416). In one approach, the model deployment circuitry 104 prepares a processing pipeline by coordinating with the data source (e.g., online message queue 120) to route messages including the live incoming data, which may include creating an message broker topic (e.g., for use with IBM® MQ, Apache Kafka, RabbitMQ, AMQP, AWS Kinesis, and/or Azure IoT Event Hub) and publishing the source data to the topic and subscribing the trained analytical model to the message broker topic. In other embodiments, the model deployment circuitry 104 routes batch data, historical data, or data from within a table or other data format within a datastore in the system to the trained analytical model. The model deployment circuitry 104 further prepares the processing pipeline by coordinating with the compute engine 118 to implement the trained analytical model on the live incoming data, batch data, historical data, and/or data table and by coordinating with the results storage database 108 to store the generated results from the compute engine 118. In one example, the generated results from the compute engine 118 are written to a log file in the results storage database 108, which is monitored by the model deployment circuitry 104. Model deployment instructions 310 stored in memory 206 may provide instructions and logic to effect selecting and retrieving the trained analytical model, deploying the trained analytical model, and storing the results. Further, model management instructions 312, compute engine interface instructions 314, and metadata management instructions 326 may provide instructions and logic for interacting with the trained analytical model, the compute engine, and the metadata, respectively.

In certain embodiments, the API 110 may expose functions of the model builder circuitry 102, the model deployment circuitry 104, and other elements of the machine 100 to the user interface circuitry 114, the GUI, or the user to enable control of the functionality of the machine 100. The API 110 may comprise a Representational State Transfer (REST) API, which may make use of standards such as HTTP, Uniform Resource Identifier (URI), JavaScript Object Notation (JSON), and Extensible Markup Language (XML). Other API types may be possible in the implementation of the API 110.

So configured, the machine 100 provides technical functionality and features to a user such that the user can easily develop, train, and store an analytical model, wherein the machine 100 creates a layer of abstraction between the user and the processes to perform those actions.

The machine 100 may implement other features beyond those described above. In one embodiment, the machine 100 is provides resource allocation and execution scheduling using the resource allocation circuitry 116. One technical problem is that multiple analytical models will often run in parallel and thus compete for resources (e.g., CPU power and memory space). If too many analytical models are running, or if analytical models having a large resource load are running, resources may become depleted, thereby slowing or preventing the processing of data. One solution is to determine the resource load of an analytical model, the resource load capability of the compute engine 118, and to determine a maximum processing frequency which the compute engine 118 will allow. Alternatively, the machine 100 may make recommendations as to increasing the amount of available resources in order to implement processing of an analytical model according to a desired frequency.

Figure 5:
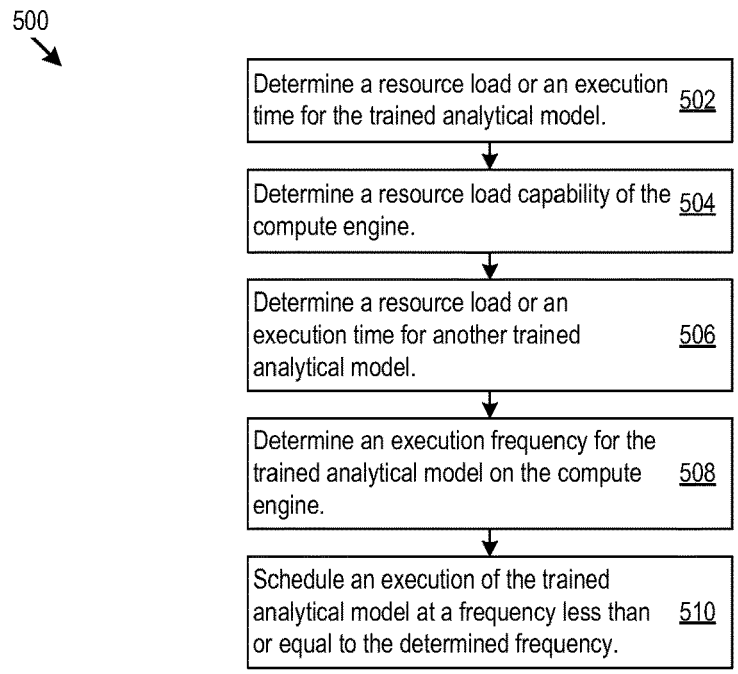
FIG. 5 shows another flow diagram of logic that the machine may implement.

FIG. 5 shows a flow diagram of logic 500 that the machine 100 may implement to account for resource load in the deployment of analytical models. For instance, the resource allocation circuitry 116 (coupled to the model deployment circuitry 104) may be configured to implement some or all of the logic 500 shown in FIG. 5. The resource allocation circuitry 116 may be configured to determine a resource load and/or an execution time for the trained analytical model (502).

In one embodiment, job performance estimation is utilized. One solution is to utilize performance modeling, which is a model or formula that relates the number of instances, types of each instance, as well as numbers of jobs running in parallel with the job execution time. The creation of such a model (essentially a "model of models"), however, requires domain expertise in the area of analytical model performance and in depth understanding of the analytical models subject to the performance modeling. An alternative solution is to utilize machine learning techniques where the job execution time is learned from variables such as the number of instances, instance type, CPU or memory utilization on each instance, or other factors. In this approach, the job estimating is learned automatically using historical performance data from execution of the trained analytical model in question. However, this machine learning approach may require performance data to be collected by running the analytical model in question multiple times with varying resource configurations to develop the historical data for execution of the trained analytical model.

The resource allocation circuitry 116 may be configured to determine a resource load capability of the compute engine 118 (504). For example, the resource allocation circuitry 116 may have access to data describing the processing and memory resources available for use by a particular user or client. In other embodiments, the resource allocation circuitry 116 may have testing models with known resource loads which it can deploy to test the available resources of the compute engine 118.

Because multiple trained analytical models may be implemented on the compute engine 118 in parallel, the resource allocation circuitry 116 may determine a resource load for a different trained analytical model and/or an execution time for the different trained analytical model (506). This different trained analytical model may also be implemented on the compute engine 118. Again, such a determination may be made using historical data for execution of the different trained analytical model. This may provide additional insight as to the current resource load capabilities of the compute engine 118.

The resource allocation circuitry 116 may be configured to determine an execution frequency for the trained analytical model on the compute engine 118 based on the resource load for the trained analytical model, the execution time for the trained analytical model, and/or the resource load capability of the compute engine 118 (508). This execution frequency may be a maximum execution frequency for the trained analytical model on the compute engine 118.

Resource allocation instructions 316, and particularly load analysis instructions 318, may include instructions and logic to perform load analysis on the trained analytical models as well as on the compute engine 118.

In order to prevent issues with overusing resources, the resource allocation circuitry 116 may be configured to schedule execution of the trained analytical model by the compute engine 118 no more frequently than the maximum execution frequency (510). The resource allocation circuitry 116 may provide an indication to a user of the maximum execution frequency. Alternatively or additionally, the resource allocation circuitry 116 may provide notification to the user that implementation of the trained analytical model on the compute engine 118 will exceed the available resources and may provide suggestions for alterations, including increasing the available resources at the compute engine 118 or reducing the load by the trained analytical model or another implemented trained analytical model on the compute engine 118.

Figure 6:
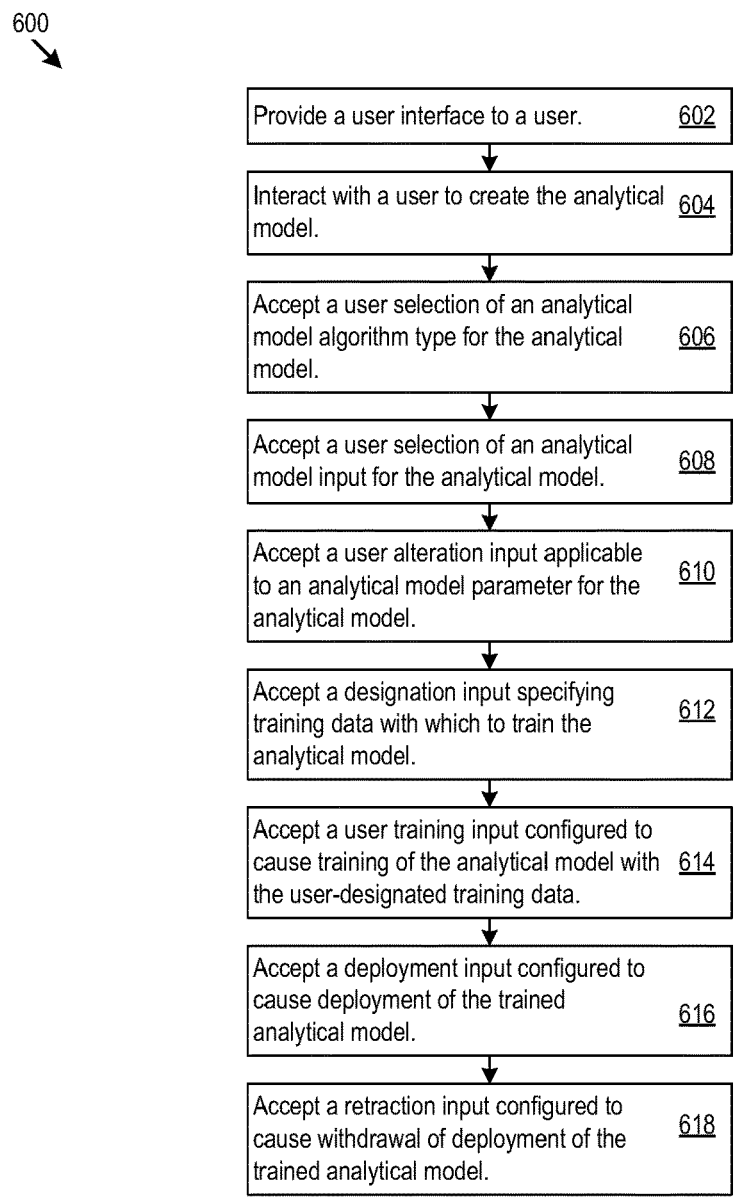
FIG. 6 shows another flow diagram of logic that the machine may implement.

FIG. 6 shows a flow diagram of logic 600 that the machine 100 may implement to provide a user interface to a user. For instance, the user interface circuitry 114 may be configured to provide an analytical model control user interface via the communication interfaces 208 to a user (602). In one embodiment, the analytical model control user interface is provided as a dynamically reconfigurable GUI, which may be provided via the networks 216 to a client computer 228, a client mobile device 230, or another device. The user interface instructions 322 stored on memory 206 may provide instructions and logic for the provision of the user interface circuitry 114 and/or the GUI.

In one embodiment, the following interactions may be provided through the analytical model control user interface. The user interface circuitry 114 may be configured to interact with the user to create an analytical model (604). For example, the analytical model control user interface may interact with the user to receive a command to create a new analytical model. The user interface circuitry 114 may be configured to accept a user selection of an analytical model algorithm type for the analytical model (606). For example, a user may select via the analytical model control user interface a particular base analytical model algorithm type that is available or provided by a particular compute engine 118 (e.g., linear regression, logistic regression, generalized linear models, neural network, or other analytical model types) for the new analytical model. Further, the user may change the base analytical model algorithm type for an existing analytical model.

The user interface circuitry 114 may be configured to accept a user selection of an analytical model input for the analytical model (608). For example, the analytical model control user interface may receive from the user a selection of one or more inputs for the new analytical model or an existing analytical model. Inputs may be any input that can suitably be fed into an analytical model (e.g., today's average temperature, time series data of the flow rate or the pressure of water in a water main, or transactional data for credit transactions). Typically the inputs are expressed in numerical values or a binary states (e.g., true or false).

The user interface circuitry 114 may be configured to accept a user alteration input that is applicable to an analytical model parameter for the new or existing analytical model (610). For example, the analytical model control user interface may receive from the user an alteration of a configuration parameter for the analytical model. Example configuration parameters include maximum number of iterations, convergence parameters, elastic or regularization parameters, and fit to intercept parameters. The applicable analytical model configuration parameters may vary with each different base analytical model algorithm type.

In another embodiment, the user interface circuitry 114 may receive a user-created pre-defined analytical model created outside the machine 100 or at a previous time by the machine 100. The pre-defined analytical model may be received in the form of an analytical model code bundle and may include pre-computed coefficients. The pre-defined analytical model may be verified (discussed below) and stored in model storage database 106. In certain embodiments, the pre-defined analytical model may only be stored upon verification, while in other embodiments, the pre-defined analytical model may be stored even upon failing a verification.

The user interface circuitry 114 may be configured to accept a designation input specifying training data with which to train the analytical model (612). For example, the analytical model control user interface may receive from the user a designation of an address or location of stored training data, which may exist on the historical data storage database 122, the hard drive 238, the solid-state drive 240, the data center 218, or another database 224 or 226. Alternatively, the analytical model control user interface may receive a direct upload of training data from the user, for example, from a client computer 228 and through the networks 216, which may subsequently be stored in any of the above referenced locations. The analytical model control user interface may allow the user to specify partitions of the training data into segments that can be interchangeably used for training and cross-validation. Alternatively, the machine 100 may automatically partition the training data into such segments.

The user interface circuitry 114 may be configured to accept a user training input configured to cause training of the analytical model with the user-designated training data by the model builder circuitry 102 to create the trained analytical model (614). The model builder circuitry 102 may responsively train the analytical model on the compute engine 118 and store the trained analytical model in the model storage database 106. In one embodiment, the user interface circuitry 114 may cause display of an error rate for the trained analytical model to the user via the analytical model control user interface (e.g., through a GUI).

Once the analytical model is trained, the user interface circuitry 114 may be configured to accept a deployment input configured to cause deployment of the trained analytical model on the compute engine 118 by the model deployment circuitry 104 (616). Similarly, the user interface circuitry 114 may be configured to accept a retraction input configured to cause withdrawal of deployment of the trained analytical model on the compute engine 118 by the model deployment circuitry 104 (618). For example, a user may submit a command via the analytical model control user interface to deploy or withdraw the trained analytical model on the compute engine 118.

In some embodiments, a user may have built, trained, configured, or otherwise developed a pre-defined analytical model using a different platform, or using the same machine 100 at a previous time. The user may have the pre-defined analytical model stored on a client device or at a separate data store (e.g., database 226, database 224, or data store 220). Instead of developing a new analytical model using the model builder circuitry 102, the user may provide the pre-defined model to the machine 100. In certain embodiments, the model builder circuitry 102 is not included with the machine 100 and the machine 100 instead utilizes user-supplied pre-defined models.

The pre-defined analytical model may exist in many different forms. For example, the pre-defined analytical model may be an analytical model code bundle including source code or compiled code for an analytical model which may define the type of analytical model and various parameters. The pre-defined analytical model may be a .JAR file (Java Archive file), a .R file (for scripts written in R programming language), a SparkR file (a variation on the .R file), a Scala code file, an OpenCV code file, a JSON file, an XML file, or other file types. The pre-defined analytical model may comprise a manifest of directions to produce an executable analytical model. The pre-defined analytical model can be source code, compiled instructions, or a proprietary file type in each case where the system includes the logic to verify and deploy for processing into the target operation environment.

The pre-defined analytical model may require coefficients and/or parameters to be used in the execution of its operations. These values will be flagged explicitly at submission time or implicitly through agreed-upon naming or structural conventions within the submitted file. The submission of these files may occur through an API interface, a UI interface, a file transfer via upload to a directory, FTP, or SFTP. The onboarding and mapping of a data storage system that contains the components of the pre-defined analytical models whose interfaces are then mapped to the system.

Figure 10:
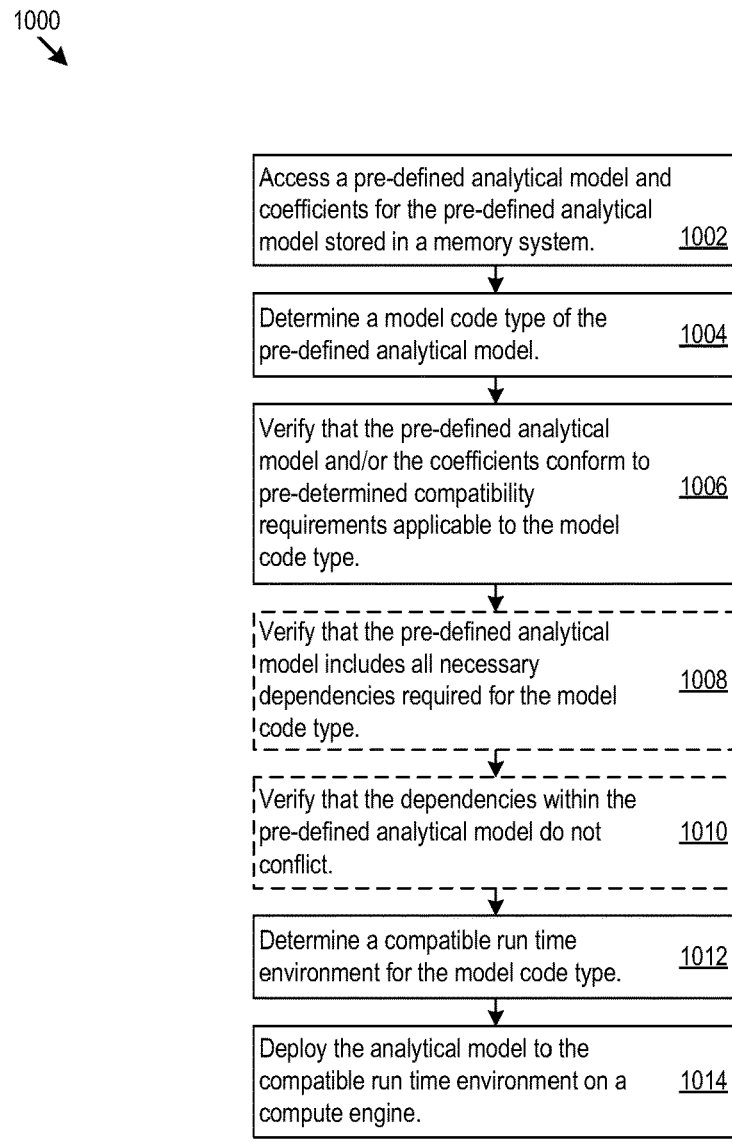
FIG. 10 shows another flow diagram of logic that the machine may implement.

FIG. 10 shows a flow diagram of logic 1000 that the machine 100 may implement to verify and deploy a pre-defined analytical model. For instance, the model deployment circuitry 104 may be configured to implement some or all of the logic 1000 shown in FIG. 10. After the pre-defined analytical model has been received and stored (discussed with respect to FIG. 11, below), the model deployment circuitry 104 may access the pre-defined analytical model stored in a memory system (e.g., model storage database 106) (1002). If coefficients for the pre-defined analytical model exist or were also uploaded (e.g., were received with the pre-defined model or otherwise provided to the machine 100) the model deployment circuitry 104 may also access the coefficients for the pre-defined analytical model stored in the memory system (1002).

The model deployment circuitry 104 may determine a model code type of the pre-defined analytical model (1004). For example, the model deployment circuitry 104 may determine that a file extension (e.g., ".JAR") is associated with a particular model code type (e.g., a JAR file). The model deployment circuitry 104 may analyze the contents of the pre-defined analytical model to detect if the model code type is included (e.g., in a header) or to detect a pattern or command of the code bundle corresponding to a pattern or command of a known model code type. The model deployment circuitry 104 may look at metadata associated with the pre-defined analytical model to determine if the model code type is indicated. As mentioned above, the pre-defined analytical model may be source code, compiled code, or proprietary file.

The model deployment circuitry 104 may verify that the pre-defined analytical model and/or the corresponding coefficients conform to pre-determined compatibility requirements applicable to the model code type (1006). Such pre-determined compatibility requirements may exist in memory 206 as pre-defined model compatibility requirements 311, shown in FIG. 3. For example, the pre-determined compatibility requirements may include dependency requirements or other requirements dictating rules which the source code or compiled code of the pre-defined analytical model must follow. In one embodiment, verifying may include determining that the pre-defined analytical model includes all the necessary dependencies required for the model code type (1008). In another embodiment, verifying may include determining that the dependencies included with the pre-defined analytical model do not conflict (1010). Such verification may be specific to particular run time environments (e.g., to ensure that the pre-defined analytical model includes all dependencies required to run on a particular run time environment). In one example, multiple run time environments may be capable of running the pre-defined analytical model (e.g., R on Docker containers or Spark R). The verification can be performed with respect to one, some, or all of those multiple candidate run time environments. The model deployment circuitry 104 may store the pre-defined analytical model in model storage database 106 only upon successful verification, or, alternatively, may store the pre-defined analytical model in model storage database 106 even upon failed verification while possibly providing flags or other feedback to the user with respect to a failure to verify.

Dependencies include features such as external libraries (e.g., code DLLs) that the source code for the pre-defined analytical model depends on to run. The dependencies may be specific to or required by a particular run time environment. For example, if a pre-defined analytical model will be implemented using Amazon Web Services™ (AWS), a pre-determined requirement may be that the pre-defined analytical model be compiled with the AWS API code, which makes the AWS API code library a dependency. This is because when the machine 100 submits the pre-defined analytical model to the target environment (e.g., AWS), the pre-defined analytical model preferably has the source compiled with all dependencies in order to be executable without further processing by the target environment. Two cases may create dependencies failures. Case 1: If some dependencies were not compiled with the source code, then the target environment won't be able to execute the pre-defined analytical model. Case 2: Dependencies with nested dependencies having conflicting versions. For example, Source Code→dependency A→dependency X (version 0.5); Source Code→dependency B→dependency X (version 1.0). When the Source Code is compiled (e.g., using Apache Maven), the Source Code will be compiled with the first version it sees. In this case, it will compile Source Code, dependency A, dependency X (version 0.5), and dependency B (but not dependency (version 1.0) which the compiler may determine is duplicative). However dependency B expected version 1.0 for dependency X, and as such, classes, methods, and code associated with dependency B may crash. To detect such dependency failures, the model deployment circuitry 104 may use logic stored as part of model deployment instructions 310 to review the pre-defined analytical model and catch Case 1 and/or Case 2, discussed above.

The model deployment circuitry 104 may determine a compatible run time environment for the model code type from among multiple run time environments (1012). For example, based upon the determination of the particular model code type for the pre-defined analytical model, the model deployment circuitry 104 may utilize a lookup table or other database to determine which run time environment or environments may support execution of the pre-defined analytical model. For example, if the model deployment circuitry 104 determines that the pre-defined analytical model is R code, the model deployment circuitry 104 may then determine that compatible run time environments include a SparkR environment, Amazon Web Services™ (AWS) Spark, and/or a dockerized tier of R machines. In another example, if the model deployment circuitry 104 determines that the pre-defined analytical model is a JAR file, the model deployment circuitry 104 may then determine that compatible run time environments include AWS Spark with Elastic Map Reduce (AWS EMR) or a self-managed cluster of machines running Datastax Cassandra-coupled deployment of Spark. Many different run time environments are possible, including Statistical Analysis System (SAS®).

If the machine 100 does not have access to a run time environment associated with the determined model code type, the model deployment circuitry 104 may output an indication to the user that the pre-defined analytical model is not executable with the currently available resources. The model deployment circuitry 104 may provide suggestions to enable execution of the pre-defined analytical model, such as a list of compatible run time environments and/or compute engines that may run the compatible run time environments. An example list of compatible run time environments and/or compute engines may be in the form of a lookup table. The system may create and curate the lookup table by deploying for execution various code bundles of unknown behavior to verify if the run time environment can support that type of code. For example, the model deployment circuitry 104 may deploy code bundles on different versions of run time environments (e.g., Spark 1.3 and Spark 1.4) to verify, on the different version of the same run time environment, the correct execution based on previous results.

The model deployment circuitry 104 may deploy the pre-defined analytical model with the set of coefficients through the communication interface 208 to a compatible run time environment on the compute engine 118 (1014), which may be similar to the process discussed with respect to step 414 of FIG. 4. In some embodiments, the model deployment circuitry 104 may parse the pre-defined analytical model for classpath (e.g., execution starting point for the code bundle), auxiliary files to add for execution, and the code bundle name.

Figure 11:
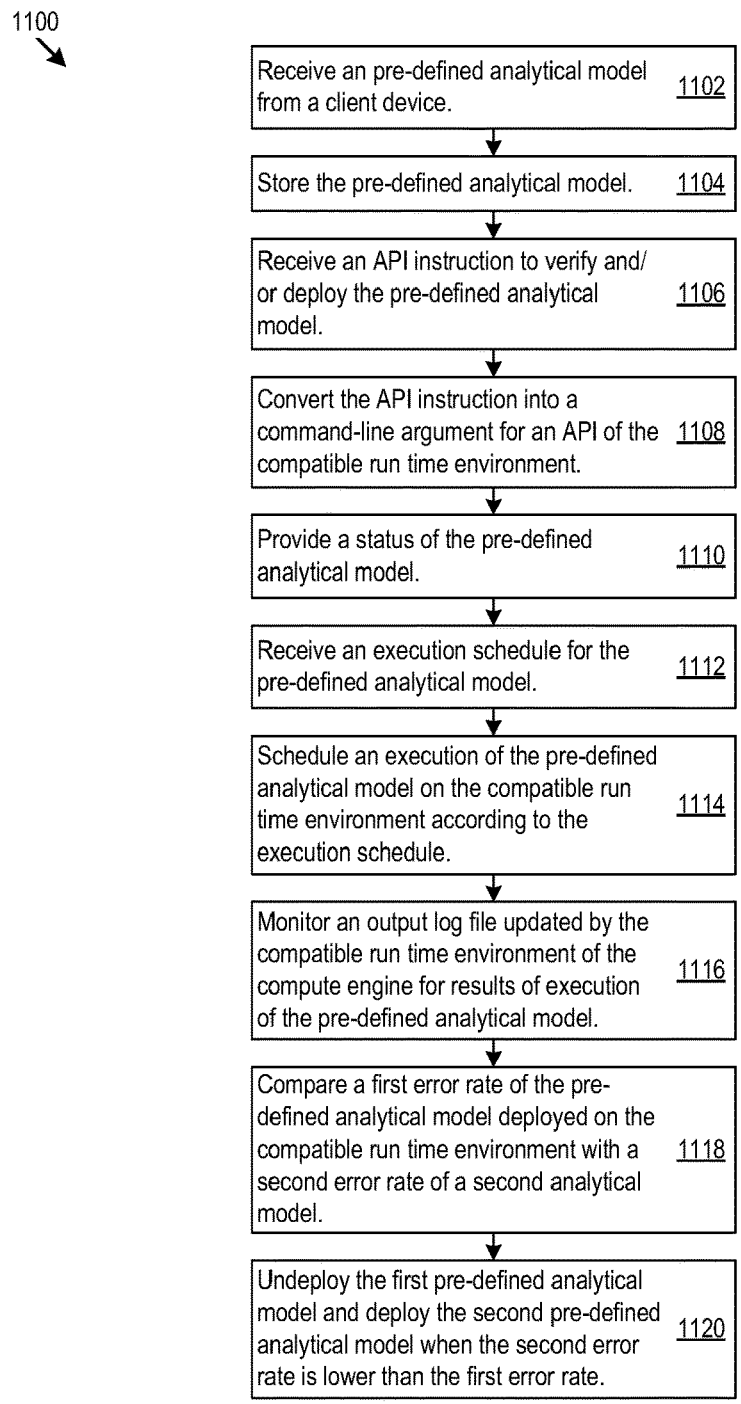
FIG. 11 shows another flow diagram of logic that the machine may implement.

FIG. 11 shows a flow diagram of logic 1100 that the machine 100 may implement to provide additional functionality with respect to the pre-defined analytical model. For instance, the model deployment circuitry 104 may be configured to implement some or all of the logic 1100 shown in FIG. 11. The model deployment circuitry 104 may receive the pre-defined analytical model and/or corresponding coefficients from a client device, for example, via the communication interface 208 (1102). A user may utilize a user interface or a command line interface to upload the pre-defined analytical model. In one embodiment, the user may use a GUI 700, discussed below with respect to FIGS. 7-9. As discussed above, the model deployment circuitry 104 may store the pre-defined analytical model in a model storage database 106 or in another data store (1104). The model deployment circuitry 104 may receive API instructions to verify the pre-defined analytical model (e.g., according to step 1006 of FIG. 10) and/or to deploy the pre-defined analytical model (e.g., according to step 1014 of FIG. 10) (1106). Examples of API instructions that may be received by the machine 100 are discussed further below. The model deployment circuitry 104 may convert the received API instructions into command-line arguments for an API of the compatible run time environment (1108). For example, the model deployment circuitry 104 may include a lookup table or other database of received commands which it is programmed to respond to according to the API 110 that correspond to the possible command-line arguments to be provided to the compatible run time environment.

The model deployment circuitry 104 may provide a status of the pre-defined analytical model via the interface, for example, to a user device (1110). The status may be provided upon request or automatically by default. The status may include, for example, whether the pre-defined analytical model is presently running, whether the pre-defined analytical model is presently deployed, how frequently it is running, how long it takes to execute, whether a data store (e.g., for results or source data) is unavailable, whether the pre-defined analytical model stopped, whether the pre-defined analytical model failed, as well as other useful status indicators. These statuses may be written to a log file or table (e.g., stored in results storage database 108) or provided to the user via a command-line interface or via a GUI 700, discussed below with respect to FIG. 7-9.

The model deployment circuitry 104 may receive an execution schedule for the pre-defined analytical model via the communication interface 208 from a client device (1112). For example, the schedule may dictate a frequency at which the pre-defined analytical model is to be executed (e.g., every 10 minutes, once a day, once a quarter, upon receipt of new data). The execution schedule may be received as a file, a value, an API command, or may be entered via a GUI 700, discussed below with respect to FIG. 7-9. The model deployment circuitry 104 may deploy and execute the pre-defined analytical model according to the execution schedule (1114). This may entail the model deployment circuitry 104 initiating individual commands to the compute engine 118 to run the pre-defined analytical model according to the execution schedule, or setting a schedule for execution that is subsequently managed by the compute engine 118.

The model deployment circuitry 104 may monitor an output log, which may be a file in a file system or a table in a database storage system, updated by the compatible run time environment (1116). The output log file may be stored in the results storage database 108. For example, the model deployment circuitry 104 may extract an application identifier and a corresponding status from the output log file as the pre-defined analytical model executes on the run time environment. The model deployment circuitry 104 may further relay the results to a user upon request or automatically upon updating of the results. The application identifier and status extracted from the output log file may be provided to the user.

The model deployment circuitry 104 may monitor multiple trained pre-defined analytical models and automatically select the best model to deploy. For example, the model deployment circuitry 104 may compare a first error rate of the pre-defined analytical model deployed on the compatible run time environment with a second error rate of a second pre-defined analytical model (1118). The second pre-defined analytical model may be currently deployed or may have been deployed previously. The error rate may indicate the accuracy of the analytical model, and may comprise, for example, a RMS error, an F1 score, a standard deviation, or another error rate indicator. The model deployment circuitry 104 may determine, for example, that the second error rate is lower than the first rate and may, as a result, undeploy the first pre-defined analytical model and instead deploy the second pre-defined analytical model (1120). This is because, in this example, the error rates indicate that the second pre-defined analytical model (e.g., including the trained coefficients) is more accurate.

Figure 12:
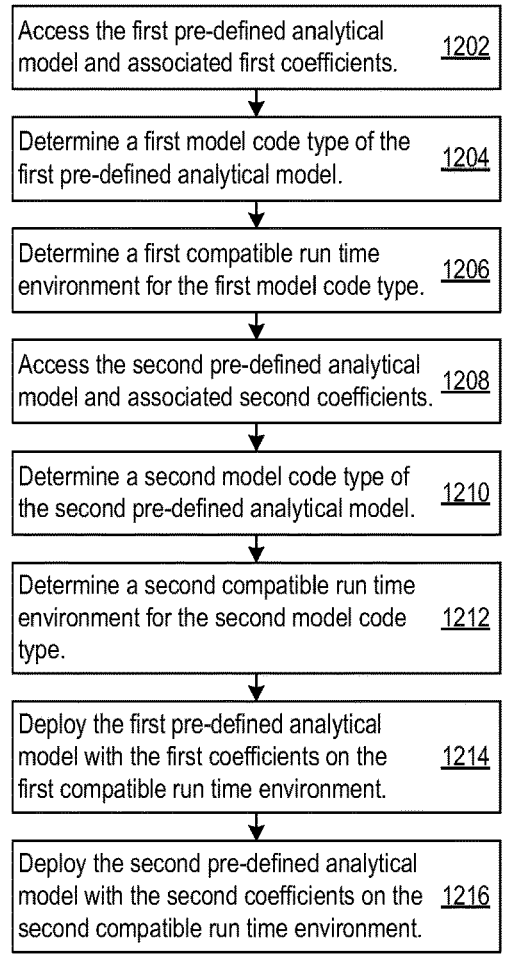
FIG. 12 shows another flow diagram of logic that the machine may implement.

In accordance with these various methods and logic flow diagrams, the machine 100, and in particular, the model deployment circuitry 104, provides an abstraction layer for the management of analytical models away from the particular requirements of the target run time environments and/or compute engines 118. Thus, for example, the machine 100 may utilize a single interface to manage and deploy different analytical models across different run time environments. For example, FIG. 12 shows a flow diagram of logic 1200 that the machine 100 may implement to decouple the management of analytical models from target run time environments. For instance, the model deployment circuitry 104 may be configured to implement some or all of the logic 1200 shown in FIG. 12. The model deployment circuitry 104 may access a first pre-defined analytical model and first coefficients from the memory system (1202). The model deployment circuitry 104 may determine a first model code type of the first pre-defined analytical model (1204) and determine a first compatible run time environment for the first model code type from among multiple available run time environments (1206). Similarly, the model deployment circuitry 104 may access a second pre-defined analytical model and second coefficients from the memory system (1208). The model deployment circuitry 104 may then determine a second model code type of the second pre-defined analytical model that is different from the first model code type (1210). The model deployment circuitry 104 may also determine a second compatible run time environment for the second model code type from among the multiple available run time environments, the second compatible run time environment being different from the first compatible run time environment (1212). The model deployment circuitry 104 may deploy the first pre-defined analytical model with the first coefficients through the communication interface 208 to the first compatible run time environment on the compute engine 118 (1214) and deploy the second pre-defined analytical model with the second coefficients through the communication interface 208 to the second compatible run time environment on the compute engine 118 (1216). Thus, though the analytical models and run time environments are disparate, the user is provided with a single tool and interface with which to manage and deploy the multiple varying analytical models.

Figure 7:
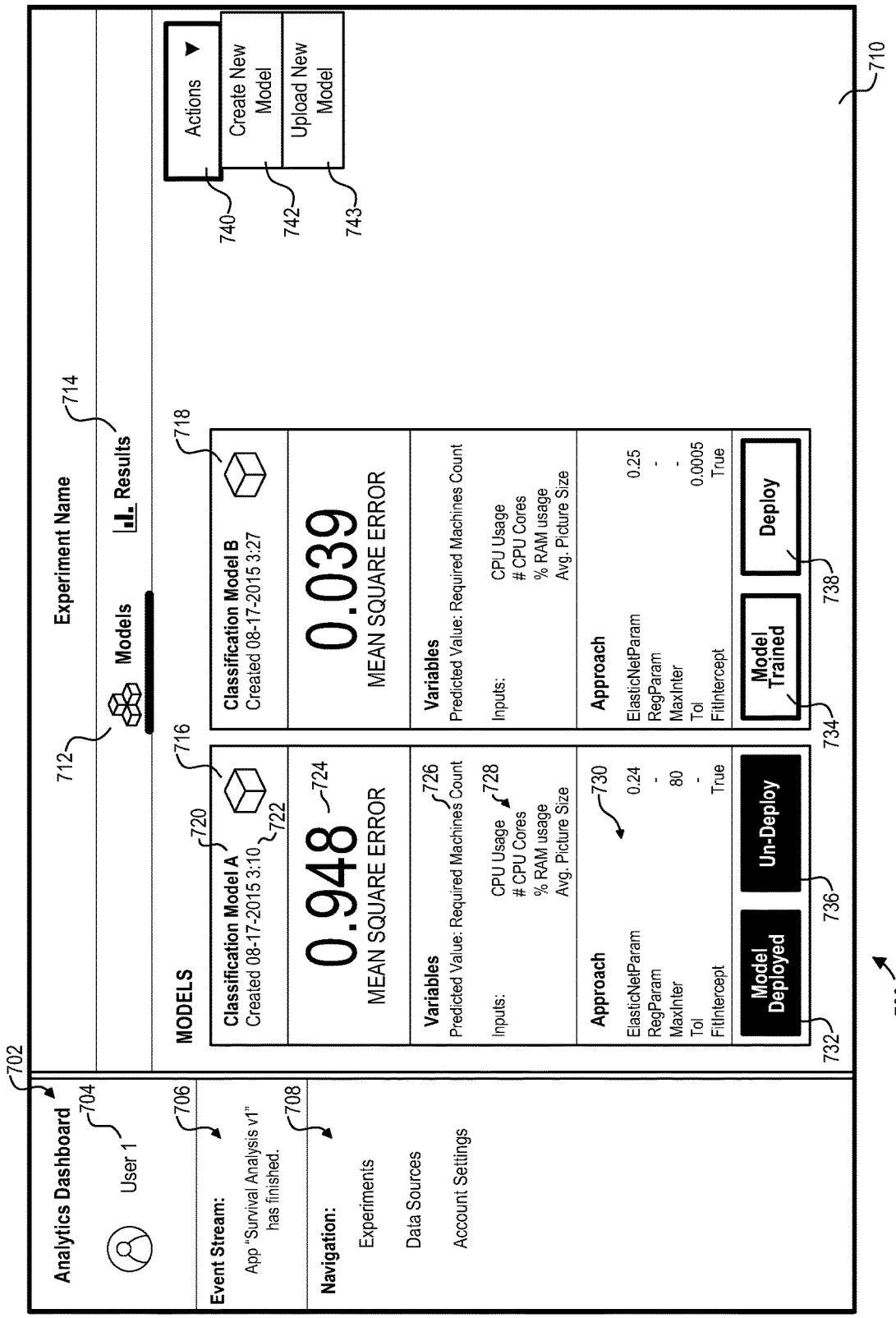
FIG. 7 shows an example graphical user interface.
Figure 9:
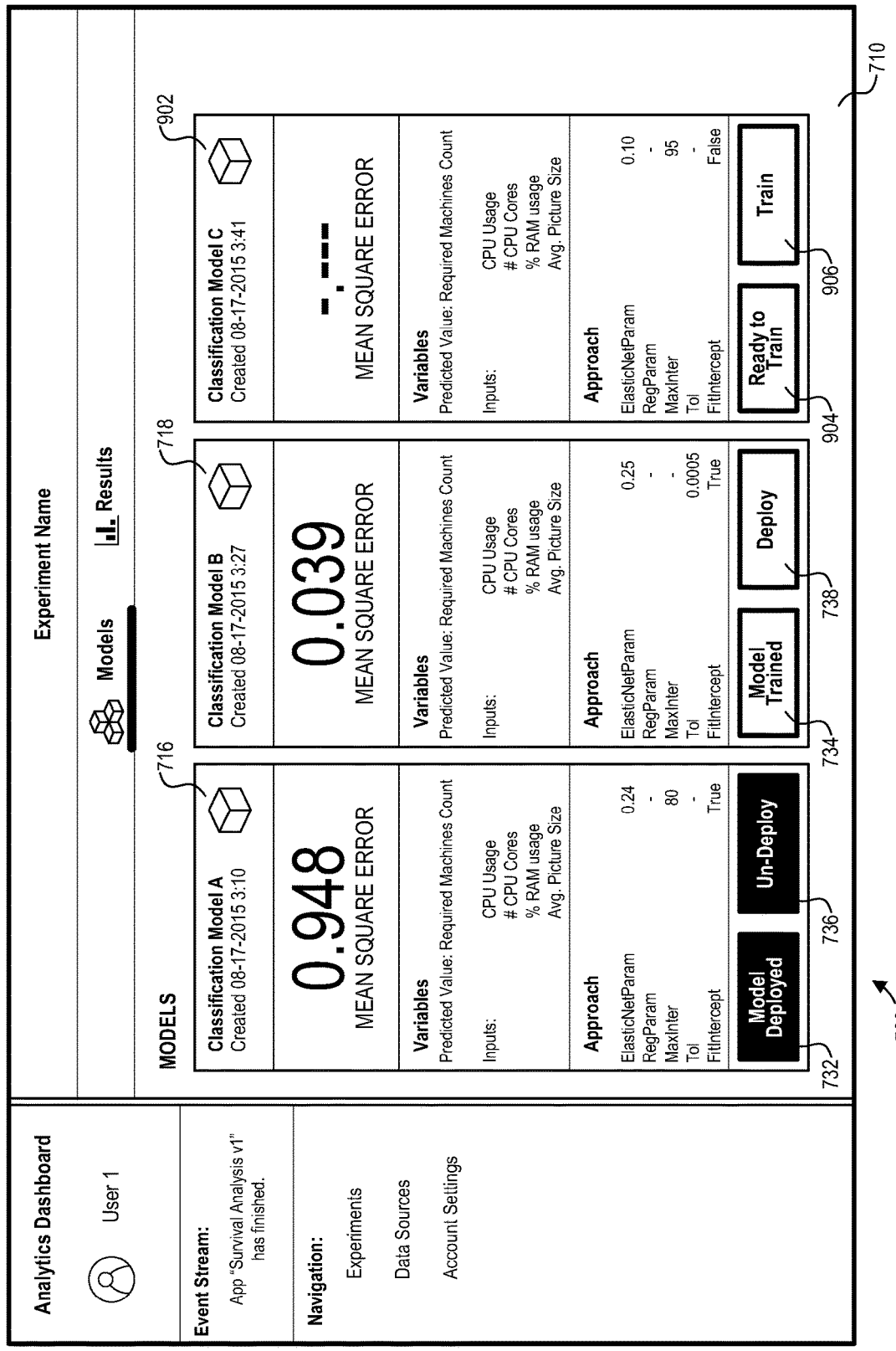
FIG. 9 shows another variation of the example graphical user interface of FIG. 7.

FIGS. 7-9 provide an example GUI 700 implemented as the analytical model control user interface. The example GUI 700 may be dynamically reconfigurable such that it can be reconfigured to be provided and displayed on a variety of different display platforms, display sizes, or display configurations. For example, the GUI 700 may be reconfigured to appear different when viewed on a client mobile device 230 versus a client computer 228. User interface instructions 322 stored in memory 206 may include logic, instructions, and data to implement the example GUI 700 or another GUI.

The GUI 700 may be generated by the processors 204 or other circuitry and provided via the communication interface 208 to a client device. During implementation of the GUI, the processors 204 may receive GUI elements (e.g., from memory 206 or elsewhere), GUI events, and GUI inputs (from various sources as discussed herein), and responsively generating the GUI 700. For example, the processors 204 may receive data or calculate data corresponding to an analytical model and may, in turn, update or otherwise change a display of data corresponding to that analytical model within the GUI 700.

The example GUI 700 may include a dashboard 702 that provides information about a user 704, an event stream 706, e.g., to provide recent action updates, and a navigation panel 708 to enable navigation between different features or screens of the GUI 700. The GUI 700 may include a main working pane 710, and in some embodiments, can be switched between displaying models 712 (as is shown in FIGS. 7-9) or results 714 (e.g., predictive results of deployed analytical models). In this example, the GUI 700 shows a first analytical model ("Classification Model A") 716 and a second analytical model ("Classification Model B") 718. Data corresponding to each analytical model 716, 718 may be displayed, which data may be collected from model metadata 328 stored in model metadata storage database 112. For example, a name 720, a creation date 722, an error rate 724, a predicted value output 726, input variables 728, and configuration parameters 730 may be shown. Other data not shown here may include an analytical model algorithm type, model storage location, or other model metadata discussed herein.

The GUI 700 may also provide a current status of the particular analytical model. For example, the first analytical model 716 is shown as presently deployed via status indicator 732, while the second analytical model 718 is shown as trained (though not deployed) via status indicator 734. A dynamic command button may be provided to perform various functions on or with the analytical model (e.g., to perform a next logical function in the lifecycle of an analytical model). For example, command button 736 provides the user with an option to un-deploy the first analytical model 716, which is currently deployed (e.g., corresponding to logic 618). Similarly, command button 738 provides the user with an option to deploy the second analytical model 718, which is currently trained but not deployed (e.g., corresponding to logic 616).

The GUI 700 may also provide an actions interface 740 that may include one or more possible actions to a user. A user may be able to select an action of creating a new analytical model by selecting the button "Create New Model" 742 (e.g., corresponding to logic 604). Turning to FIG. 8, upon selecting the button 742 to create a new analytical model, an interface 802 to add a new model may appear as a pop-up screen or other graphical interface component, providing the user with the ability to add and configure the new analytical model. The interface 802 may include user-updatable fields, for example, to provide a name 804, a description 806, a selection of an output variable 808 (e.g., "label variables"), a selection of input variables 810 (e.g., corresponding to logic 608), a selection of an analytical model algorithm type 812 (e.g., "approach template") (e.g., corresponding to logic 606), and an interface to enable alteration of one or more configuration parameters 814 (e.g., "attributes") (e.g., corresponding to logic 610) for the new analytical model. The user may type, select, or otherwise provide the inputs to the fields shown.

In certain embodiments, a user may be able to upload a pre-defined analytical model, for example in the form of an analytical model code bundle. This may be performed in addition to or instead of the analytical model creation steps discussed above. The GUI 700 may provide an interface element that allows a user to upload their own pre-defined analytical model. For example, upon selection of the button 743 ("Upload New Model"), an interface may appear allowing a user to select or drag-and-drop one or more files of the pre-defined analytical model for uploading to the system. The machine 100 may verify that the pre-defined analytical model is correct and/or adheres to pre-determined requirements. Upon verification, the GUI 700 may show the uploaded analytical model in the main working pane 710 or elsewhere. However, if the pre-defined analytical model fails verification, one or more errors or issues may be flagged or otherwise presented to the user via the GUI 700.

After the user is finished with adding the new model via the interface 802, the interface 802 may be removed and the main working pane 710 may now show the newly created analytical model 902. The new analytical model 902 may show much of the same data fields shown for the first analytical model 716 and the second analytical model 718, though some data fields may be empty or omitted for lack of data. For example, prior to being trained, the new analytical model 902 may not have a calculated error rate and therefore the error rate may not be displayed. The new analytical model 902 may include a dynamic status indicator 904 showing that the new analytical model 902 is ready to be trained. Further, the new analytical model 902 may also include a dynamic command button 906 providing the user with an option to train the new analytical model 902 (e.g., corresponding to logic 614).

The GUI 700 may provide other functionality not expressly shown here. For example, the GUI 700 may provide an interface to set up processing pipelines by specifying a target results storage database 108 for storage of the results. The GUI 700 may also provide an interface to list or catalog existing analytical models, possibly organized within related projects or collections. The GUI 700 may provide an interface to lookup status of jobs in progress or that have completed including any associated success or error messages. Performance specifications (e.g., error rates) may be displayed allowing users to compare the accuracy of various configurations of different analytical models.

Code Examples

The following are examples illustrating and explaining various features discussed above.

Below is sample code that demonstrates how a code bundle trains a machine learning model. In the illustrated example, a linear regression model is trained having an equation similar to $ax+by=d$, where a and b are the coefficients that are being determined (e.g., via training). Inputs x and y may correspond to the relevant inputs used for the particular analytical model (e.g., temperature and date, etc.). The output d is the predicted output. In the example below, the arrows ("→") indicate lines where we are determining the coefficients by training the model, printing those coefficients (weights), and saving the results.

```
public Object trainModelAndSaveResults( ) {
    SparkConf sparkConf = new SparkConf( ).setAppName(appName);
    JavaSparkContext jsc = new JavaSparkContext(sparkConf);
    // Set AWS keys
    jsc.hadoopConfiguration( ).set("fs.s3n.impl",
        "org.apache.hadoop.fs.s3native.NativeS3FileSystem");
    jsc.hadoopConfiguration( ).set("fs.s3n.awsAccessKeyId",
accessKey);
    jsc.hadoopConfiguration( ).set("fs.s3n.awsSecretAccessKey",
secretKey);
    // Load the training data from S3
    JavaRDD<Row> trainingData = filterInputCSVFile(jsc, "s3n://" +
s3BucketName + "/" + inputFile, outputVariable, inputVariables);
    // Parse the data points
    JavaRDD<LabeledPoint> parsedData = trainingData.map(new
ParseRow( ));
    // Normalize the data points for linear regression
    JavaRDD<LabeledPoint> normalizedData = parsedData.map(new
NormalizePoint( )).cache( );
    // Train the linear regression model (ax+by)
    // -> This is where the coefficients of the model are trained;
for example, a and b for ax+by
    final LinearRegressionModel model =
LinearRegressionWithSGD.train(JavaRDD.toRDD(normalizedData),
modelPara.getNumIter( ));
    // -> Print the coefficients a and b for ax+by
    System.out.println("Linear regression model weights:\n" +
model.weights( ));
    // Evaluate model on training examples and compute training error
    JavaRDD<Tuple2<Double, Double>> valuesAndPreds =
normalizedData.map(new LinearRegressionPredictPoint(model));
    double MSE = new JavaDoubleRDD(valuesAndPreds.map(new
SquareDistance( )).rdd( )).mean( );
    System.out.println("Training Mean Squared Error = " + MSE);
    /* -> Save results to target database...
Code removed for simplicity */
    return model;
}
```

Below are example API calls that may be made, for example, according to API 110. A user may create and submit the API calls via the communication interface 208, or the API calls may be created by the user interface 114 implemented as a GUI 700.

The following is an example API call to upload a pre-defined analytical model. This API call may be made, for example, as part of step 1102 of FIG. 11. The name of the code bundle is project-sample-1.0.jar. The Request (POST) API call may be as follows:

curl -X POST -F "file=@/verify_jar/project-sample-1.0.jar" 52.23.153.208:8080/v1/jars A Response may appear as follows:

```
{
    "app_name": "project-sample-1.0.jar",
    "success": true
}
```

The following is an example API call to retrieve information about an uploaded pre-defined analytical model. Note this API call is not asking the model developer for the status of any running code bundles in the target environment (described further below). The Request (GET) API call may be as follows:

curl 52.23.153.208:8080/v1/jars

A Response may appear as follows:

```
[
    {
        "app_name": "missing-dependency-sample-1.0.jar",
        "created": "2015-11-02 07:15:34",
        "updated": "2015-11-02 07:15:34"
    },
    {
        "app_name": "DemoModel-0.0.1-SNAPSHOT.jar",
        "created": "2015-11-02 17:32:04",
        "updated": "2015-11-02 17:32:04"
    },
    {
        "app_name": "project-sample-1.0.jar",
        "created": "2015-11-02 17:55:41",
        "updated": "2015-11-02 17:55:41"
    }
]
```

The following is an example of a more specific API call to query the model developer for information about a particular code bundle. Note this API call is not asking the model developer for the status of any running code bundles in the target environment (described further below). The Request (GET) API call may be as follows:

curl 52.23.153.208:8080/v1/jars/project-sample-1.0.jar

A Response may appear as follows:

```
{
    "app_name": "project-sample-1.0.jar",
    "created": "2015-11-02 17:55:41",
    "updated": "2015-11-02 17:55:41"
}
```

The following is an example of an API call to verify that the code bundle is executable in a run time environment by inspecting 1) it has all dependencies and 2) the dependencies do not conflict. This may correspond to steps 1006, 1008, and 1010 of FIG. 10. The following example verifies the code bundle for a Spark YARN environment, but this can be extended to verify the code bundle for any target environment. In the first example, the code bundle is verified. A Request (POST) may be as follows:

```
curl -X POST -H 'Content-Type:application/json' -d '{
    "classPath": "com.Sample"
}' 52.23.153.208:8080/v1/verify/project-sample-1.0.jar
```

A Response may appear as follows:

```
{
    "message": [
        "Jar is valid"
    ],
    "status": true
}
```

In the next API call example, the verification returns false because there are missing dependencies. A Request (POST) may be as follows:

```
curl -X POST -H 'Content-Type:application/json' -d '{
"classPath": "com.Sample"
}' 52.23.153.208:8080/v1/verify/missing-dependency-sample-1.0.jar
```

A Response may appear as follows:

```
{
    "message": [
        "Missing dependencies in jar - class not found exception for ObjectMapper.class"
    ],
    "status": false
}
```

In the next API call example, the verification returns false because the dependencies in the code bundle conflict. A Request (POST) may be as follows:

```
curl -X POST -H 'Content-Type:application/json' -d '{
"classPath": "com.Sample"
}' 52.23.153.208:8080/v1/verify/version-error-sample-1.0.jar
```

A Response may appear as follows:

```
{
    "message": [
        "Version conflicts in jar dependencies - no method found for JsonFactory.class"
    ],
    "status": false
}
```

The following is an example of an API call to Submit request to run code bundle in target environment. It specifies the code bundle name, the classpath for execution, and additional parameters specific to the code bundle. In this example, a code bundle called "DemoModel-0.0.1-SNAPSHOT" is being executed to train a logistic regression model on a historical dataset in an example Spark YARN target environment. A Request (POST) may be as follows:

```
curl -X POST -H 'Content-Type:application/json' -d '{
    "classPath":
"com.accenture.modelmanagement.DemoModel.-
LogisticRegressionDemo",
    "appName": "DemoModel-0.0.1-SNAPSHOT",
    "modelId": "jtest",
    "params": {
        "input": {
            "name": "training_data.txt",
            "type": "hdfs"
        },
        "model": "deprecated",
        "output": {
            "name": "omm_prediction",
            "type": "dynamo"
        },
        "template": {
            "modelName": "LogisticRegression",
            "ElasticNetParam": "-",
            "RegParam": "0.001",
            "MaxIter": "100",
            "Tol": "-",
            "FitIntercept": "true"
        }
    }
}' 52.23.153.208:8080/v1/jobs
```

The response returns the job_id that can be used later to query for the status of the execution, which may appear as follows:

```
{
"RESULT": {
    "class_path":
"com.accenture.modelmanagement.DemoModel.-
LogisticRegressionDemo",
    "job_id": "1537ece9-ff61-4292-ae2b-b96624d4a6ea",
    "yarn_application_id": "application_1439572410461_0480"
},
"STATUS": "ACCEPTED"
}
```

The following is an example API call to query the machine 100 for the status of a deployed code bundle running in the target environment. The example API call includes the jod_id from the previous API call. The Request (GET) may be as follows:
Curl 52.23.153.208:8080/v1/jobs/1537ece9-ff61-4292-ae2b-b96624d4a6ea The following example response returns the a status of "RUNNING," which may appear as follows:

```
{
    "appConfigPath": "demo_config.properties",
    "appName": "DemoModel-0.0.1-SNAPSHOT",
    "classPath":
"com.accenture.modelmanagement.DemoModel.-
LogisticRegressionDemo",
    "created": 1446488339000.0,
    "jobId": "1537ece9-ff61-4292-ae2b-b96624d4a6ea",
    "modelId": "jtest",
    "params": {
        "input": {
            "name": "training_data.txt",
            "type": "hdfs"
        },
        "model": "deprecated",
        "output": {
            "name": "omm_prediction",
            "type": "dynamo"
        },
        "template": {
            "ElasticNetParam": "-",
            "FitIntercept": "true",
            "MaxIter": "100",
            "RegParam": "0.001",
            "Tol": "-",
            "modelName": "LogisticRegression"
        }
    },
    "status": "RUNNING",
    "yarnApplicationId": "application_1439572410461_0480"
}
```

The following example response returns the a status of "FINISHED," which may appear as follows:

```
{
    "appConfigPath": "demo_config.properties",
    "appName": "DemoModel-0.0.1-SNAPSHOT",
    "classPath":
    "com.accenture.modelmanagement.DemoModel.-
    LogisticRegressionDemo",
    "created": 1446488339000.0,
    "jobId": "1537ece9-ff61-4292-ae2b-b96624d4a6ea",
    "modelId": "jtest",
    "params": {
        "input": {
            "name": "training_data.txt",
            "type": "hdfs"
        },
        "model": "deprecated",
        "output": {
            "name": "omm_prediction",
            "type": "dynamo"
        },
        "template": {
            "ElasticNetParam": "-",
            "FitIntercept": "true",
            "MaxIter": "100",
            "RegParam": "0.001",
            "Tol": "-",
            "modelName": "LogisticRegression"
        }
    },
    "status": "FINISHED",
    "yarnApplicationId": "application_1439572410461_0480"
}
```

In accordance with the disclosed processes and structures, the machine 100, and in particular, the model builder circuitry 105 and the model deployment circuitry 104, provide a level of abstraction to a user for the development, testing, deployment, and management of analytical models. This layer of abstraction lowers the initial time burden, resource burden, and software engineering knowhow required to develop and test analytical models. Further, the methods and structure described herein provide for "lightweight" analytical model development, training, and deployment as the abstraction layer on top of the models exposes a wide range of possible analytical approaches, which are easily configurable and trained on-demand. Such lightweight model development and training can allow for quick iterations, allowing a user to iteratively adjust the parameters of the analytical model and re-test during the process of creating an accurate analytical model for a particular application or dataset. This enables a domain expert without extensive data science and data engineering backgrounds or understanding to easily create and iteratively develop and deploy an accurate data model. Once the analytical model has been trained and stored, it can be easily deployed against a stream of incoming data or a batch of data. Predictions are stored in the results storage database 108 as the data is processed and are readily made available for viewing and further processing.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A machine comprising:
   a communication interface operable to communicate with a compute engine;
   a memory system configured to store:
   a pre-defined analytical model;
   coefficients for the pre-defined analytical model; and
   pre-determined compatibility requirements; and
   model deployment circuitry coupled to the communication interface and the memory system, the model deployment circuitry configured to:
   access the pre-defined analytical model in the memory system;
   access the coefficients for the pre-defined analytical model from the memory system;
   determine a model code type of the pre-defined analytical model;
   verify that the pre-defined analytical model conforms to the pre-determined compatibility requirements applicable to the model code type;

determine a compatible run time environment for the model code type from among multiple available run time environments; and
deploy the pre-defined analytical model with the set of coefficients through the communication interface to the compatible run time environment on the compute engine.

2. The machine of claim 1 wherein the model deployment circuitry is configured to deploy the pre-defined analytical model by submitting a command-line argument, via the communication interface, to an application program interface (API) of the compatible run time environment.

3. The machine of claim 1 wherein the model deployment circuitry is configured to receive, via the communication interface, an application program interface (API) instruction to verify or deploy the pre-defined analytical model, or both.

4. The machine of claim 3 wherein the model deployment circuitry is further configured to convert the API instruction into a command-line argument for an API of the compatible run time environment.

5. The machine of claim 1 wherein the model deployment circuity is further configured to provide a status of the pre-defined analytical model via the communication interface.

6. The machine of claim 1 wherein the model deployment circuitry is further configured to verify that the pre-defined analytical model in combination with the coefficients conform to the pre-determined compatibility requirements applicable to the model code type by determining that a code bundle includes all necessary dependencies required for the model code type.

7. The machine of claim 6 wherein the model deployment circuitry is further configured to determine that the dependencies within the code bundle do not conflict.

8. The machine of claim 1 wherein the model deployment circuitry is further configured to:
receive an execution schedule, via the communication interface; and
schedule an execution of the pre-defined analytical model by the compatible run time environment according to the execution schedule.

9. The machine of claim 1 wherein the model deployment circuitry is further configured to:
compare a first error rate of the pre-defined analytical model deployed on compatible run time environment with a second error rate of a second pre-defined analytical model;
determine that the second error rate is lower than the first error rate; and
undeploy the first pre-defined analytical model and deploy the second pre-defined analytical model on a run time environment in response to determining that the second error rate is lower than the first error rate.

10. The machine of claim 1 wherein the model deployment circuity is further configured to:
monitor an output log file updated by the compatible run time environment of the compute engine for results of execution of the pre-defined analytical model.

11. A method comprising:
accessing, by model deployment circuitry, an pre-defined analytical model stored in a memory system;
accessing, by the model deployment circuitry, coefficients for the pre-defined analytical model stored in the memory system;
determining, by the model deployment circuitry, a model code type of the pre-defined analytical model;
verifying, by the model deployment circuitry, that the pre-defined analytical model conforms to pre-determined compatibility requirements applicable to the model code type, the pre-determined compatibility requirements stored in the memory system;
determining, by the model deployment circuitry, a compatible run time environment for the model code type from among multiple available run time environments; and
deploying, by the model deployment circuitry, the pre-defined analytical model with the set of coefficients through a communication interface to the compatible run time environment on a compute engine.

12. The method of claim 11 further comprising receiving, via the communication interface, the pre-defined analytical model from a client device.

13. The method of claim 11 further comprising receiving, via the communication interface, an application program interface (API) instruction to verify or deploy the pre-defined analytical model, or both.

14. The method of claim 13 further comprising converting, by the model deployment circuitry, the API instruction into a command-line argument for an API of the compatible run time environment.

15. The method of claim 11 further comprising providing, by the model deployment circuitry, a status of the pre-defined analytical model via the communication interface.

16. The method of claim 11 further wherein verifying that the pre-defined analytical model in combination with the coefficients conform to the pre-determined compatibility requirements applicable to the model code type further comprises determining, by the model deployment circuitry, that the pre-defined analytical model includes all necessary dependencies required for the model code type.

17. The method of claim 16 further comprising determining, by the model deployment circuitry, that the dependencies within the pre-defined analytical model do not conflict.

18. The method of claim 11 further comprising:
receiving an execution schedule via the communication interface from a client device; and
scheduling, by the model deployment circuitry, an execution of the pre-defined analytical model by the compatible run time environment according to the execution schedule.

19. The machine of claim 10 further comprising:
comparing, by the model deployment circuitry, a first error rate of the pre-defined analytical model deployed on the compatible run time environment with a second error rate of a second pre-defined analytical model;
determining, by the model deployment circuitry, that the second error rate is lower than the first error rate; and
undeploying the first pre-defined analytical model and deploying the second pre-defined analytical model on a run time environment in response to determining that the second error rate is lower than the first error rate.

20. A machine comprising:
a communication interface operable to communicate with a compute engine;
a memory system configured to store:
a first pre-defined analytical model;
first coefficients for the first pre-defined analytical model;
a second pre-defined analytical model;
second coefficients for the second pre-defined analytical model; and
pre-determined compatibility requirements; and
model deployment circuitry coupled to the communication interface and the memory system, the model deployment circuitry configured to:
access the first pre-defined analytical model and the first coefficients from the memory system;
determine a first model code type of the first pre-defined analytical model;

determine a first compatible run time environment for the first model code type from among multiple available run time environments;
access the second pre-defined analytical model and the second coefficients from the memory system;
determine a second model code type of the second pre-defined analytical model, the second model code type being different from the first model code type;
determine a second compatible run time environment for the second model code type from among the multiple available run time environments, the second compatible run time environment being different from the first compatible run time environment;
deploy the first pre-defined analytical model with the first coefficients through the communication interface to the first compatible run time environment on the compute engine; and deploy the second pre-defined analytical model with the second coefficients through the communication interface to the second compatible run time environment on the compute engine.

* * * * *